(12) United States Patent
Itou

(10) Patent No.: US 9,941,498 B2
(45) Date of Patent: Apr. 10, 2018

(54) POLYOLEFIN-BASED POROUS FILM AND METHOD FOR PRODUCING THE SAME

(75) Inventor: Miyuki Itou, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 434 days.

(21) Appl. No.: 13/997,724

(22) PCT Filed: Nov. 25, 2011

(86) PCT No.: PCT/JP2011/077246
§ 371 (c)(1),
(2), (4) Date: Jun. 25, 2013

(87) PCT Pub. No.: WO2012/090632
PCT Pub. Date: Jul. 5, 2012

(65) Prior Publication Data
US 2013/0337311 A1    Dec. 19, 2013

(30) Foreign Application Priority Data

Dec. 28, 2010 (JP) ................................ 2010-292573
Dec. 28, 2010 (JP) ................................ 2010-292576

(51) Int. Cl.
| | | |
|---|---|---|
| H01M 2/16 | (2006.01) |
| H01M 2/14 | (2006.01) |
| C08J 5/18 | (2006.01) |
| C08J 7/04 | (2006.01) |
| C08J 7/12 | (2006.01) |
| B29C 55/14 | (2006.01) |
| H01M 10/0525 | (2010.01) |
| H01M 10/052 | (2010.01) |

(52) U.S. Cl.
CPC .......... *H01M 2/1653* (2013.01); *B29C 55/143* (2013.01); *C08J 5/18* (2013.01); *C08J 7/047* (2013.01); *C08J 7/123* (2013.01); *H01M 2/145* (2013.01); *H01M 2/1686* (2013.01); *H01M 10/0525* (2013.01); *C08J 2323/02* (2013.01); *C08J 2433/02* (2013.01); *H01M 10/052* (2013.01); *H01M 2220/20* (2013.01)

(58) Field of Classification Search
CPC ..... C08J 5/18; C08J 7/047; C08J 7/123; C08J 2323/02; C08J 2433/02; H01M 2/145; H01M 2/1653; H01M 2/1686; H01M 10/0525; H01M 10/052; H01M 2220/20; B29C 55/143
See application file for complete search history.

(56) References Cited

U.S. PATENT DOCUMENTS

| | | | |
|---|---|---|---|
| 4,620,956 A | 11/1986 | Hamer | |
| 5,691,047 A | 11/1997 | Kurauchi et al. | |
| 6,245,270 B1 | 6/2001 | Mizutani et al. | |
| 6,245,272 B1 | 6/2001 | Takita et al. | |
| 6,540,953 B1 * | 4/2003 | Lee | B01D 67/003 264/210.3 |
| 6,602,593 B1 | 8/2003 | Callahan et al. | |
| 6,627,346 B1 | 9/2003 | Kinouchi et al. | |
| 8,298,465 B2 * | 10/2012 | Kikuchi | C08J 5/18 264/173.15 |
| 2003/0104236 A1 | 6/2003 | Nguyen et al. | |
| 2007/0019663 A1 | 1/2007 | Takagi et al. | |
| 2007/0148552 A1 | 6/2007 | Ikemoto et al. | |
| 2007/0196638 A1 * | 8/2007 | Wei | B01D 67/0027 428/304.4 |
| 2010/0015131 A1 | 1/2010 | Mi et al. | |
| 2010/0021822 A1 | 1/2010 | Ikemoto et al. | |
| 2010/0129720 A1 | 5/2010 | Sako et al. | |
| 2010/0173187 A1 | 7/2010 | Nishikawa et al. | |
| 2010/0178544 A1 | 7/2010 | Nishikawa et al. | |
| 2010/0203396 A1 | 8/2010 | Murata | |
| 2010/0209745 A1 | 8/2010 | Kimishima | |
| 2013/0040184 A1 | 2/2013 | Busch et al. | |

FOREIGN PATENT DOCUMENTS

| | | |
|---|---|---|
| CA | 2723394 A1 | 11/2009 |
| CN | 1294608 A | 5/2001 |
| CN | 101384409 A | 3/2009 |
| EP | 0353148 A2 | 1/1990 |
| JP | S58-059072 A | 4/1983 |
| JP | S58-197659 A | 11/1983 |
| JP | S59-037292 A | 2/1984 |

(Continued)

OTHER PUBLICATIONS

Office Action issued in related Chinese Patent Application No. 201180062735.1 dated Jan. 6, 2014.
Office action issued in corresponding Taiwanese Patent Application No. 100143517 dated Sep. 18, 2013.
International Search Report issued in corresponding International Patent Application No. PCT/JP2011/077246 dated Dec. 27, 2011.
Supplementary European Search Report issued in corresponding European Patent Application No. 11854190.3 dated Nov. 24, 2016.
Partial Supplementary European Search Report issued in corresponding European Patent Application No. 11854190.3 dated Aug. 10, 2016.

(Continued)

*Primary Examiner* — Irina S Zemel
(74) *Attorney, Agent, or Firm* — Morgan, Lewis & Bockius LLP

(57) ABSTRACT

A method for producing a polyolefin-based porous film includes an (A) step: a raw fabric forming step for forming a non-porous raw fabric from a polyolefin-based resin composition, a (B) step: an MD cold stretching step for cold stretching the non-porous raw fabric obtained in the (A) step at a temperature of −20° C. to (Tm−30)° C. (Tm is a melting point (° C.) of the non-porous raw fabric) in an extruding direction (MD) of the raw fabric to make the raw fabric porous; a (D) step: a TD cold stretching step for cold stretching a film processed in the (B) step in a direction (TD) perpendicular to the MD, and an (H) step: a thermal fixing step, in the above order.

3 Claims, 4 Drawing Sheets

(56) References Cited

FOREIGN PATENT DOCUMENTS

| | | |
|---|---|---|
| JP | 62-121737 A | 6/1987 |
| JP | H02-035918 A | 2/1990 |
| JP | H11-297297 A | 10/1999 |
| JP | 3003830 B2 | 1/2000 |
| JP | 2001-122998 A | 5/2001 |
| JP | 2003-192814 A | 7/2003 |
| JP | 2004-323820 A | 11/2004 |
| JP | 2005-171230 A | 6/2005 |
| JP | 3852492 B2 | 11/2006 |
| JP | 2007-063547 A | 3/2007 |
| JP | 2008-094911 A | 4/2008 |
| JP | 2009-527633 A | 7/2009 |
| JP | 2010-106071 A | 5/2010 |
| JP | 2010-137509 A | 6/2010 |
| JP | 2011-000832 A | 1/2011 |
| JP | 2011246539 A  * | 12/2011 |
| KR | 2010-0082830 A | 7/2010 |
| TW | 200642828 A | 12/2006 |
| TW | 200738799 A | 10/2007 |
| TW | 200844152 A | 11/2008 |
| TW | 200902606 A | 1/2009 |
| TW | 200913353 A | 3/2009 |
| WO | 2007/098339 A2 | 8/2007 |
| WO | 2008/149986 A1 | 12/2008 |
| WO | WO2010012801  * | 2/2010 |
| WO | 2011/123626 A1 | 11/2011 |

OTHER PUBLICATIONS

European Search Report issued in counterpart European Patent Application No. 17169327.8 dated Jul. 25, 2017.

European Search Report issued in counterpart European Patent Application No. 17188030.5 dated Dec. 12, 2017.

* cited by examiner

US 9,941,498 B2

POLYOLEFIN-BASED POROUS FILM AND METHOD FOR PRODUCING THE SAME

TECHNICAL FIELD

The present invention relates to a polyolefin-based porous film, in particular, a polyolefin-based porous film suitably used as a battery separator, and a method for producing the same.

BACKGROUND ART

A polyolefin-based porous film excels in mechanical properties, chemical resistance, electric properties and the like, and is used for packaging material use, medical use, electric material use and the like. Among them, in the electric material use, a polyolefin-based porous film is used to design a safer secondary battery by using a function as a separator for separating a positive electrode from a negative electrode and making only ions permeate therethrough, and a shutdown function for preventing a risk of a battery reaction to be went out of control due to a temperature increase inside of the battery (function for closing pores at a temperature lower than a thermal runaway temperature).

A method for producing a polyolefin-based porous film is classified broadly into two methods, a wet method for forming pores in an extraction step, and a dry method for forming pores in a stretching step (also called stretching-opening method).

Examples of the former producing method include a method described in Patent Document 1. Patent Document 1 discloses a producing technology for improving mechanical strength (tension strength, modulus of elasticity in tension) by making birefringence of a wet film composed of three components, which is formed by melt kneading and extruding a polyethylene to which a plasticizer (DOP) and silicate fine particles are added, and then, by extracting the plasticizer and the silicate fine particles in an extraction tank to form pores, be $1.0 \times 10^{-3}$ or more.

On the other hand, examples of the latter producing method include methods described in Patent Documents 2 to 5. Patent Document 2 discloses a producing method of a polyethylene porous film, and discloses a basic technology in which a raw fabric before providing pores therein (hereinafter, also referred to as "non-porous raw fabric") is MD cold stretched, and then, is MD heat stretched. Patent Document 3 discloses a relationship between a blow-up ratio and various physical properties in an inflation molding using a circular die. Patent Document 4 discloses a technology for adding less than 10 mass % of ethylene-propylene rubber (EPR) and ethylene-propylene-diene rubber (EPDM) so as to improve mechanical strength. Patent Document 5 discloses a three-layered (PP/PE/PP) laminate porous film made of a polypropylene (PP) and a polyethylene (PE), and also discloses making birefringence of a polyethylene raw fabric before stretching be within a range of $2 \times 10^{-2}$ to $4 \times 10^{-2}$ and various physical properties including a pore surface area of the obtained laminate porous film. Patent Document 6 discloses that, as a technology for restoring a decrease in a film width generated by MD heat stretching, a three-layered (PP/PE/PP) laminate porous film is formed as a porous film, and a composition of an isotactic polypropylene and a random polypropylene is used as a material for the porous film. Patent Document 7 discloses, as a producing method of a biaxially-stretched porous film using a dry method, a technique for transverse stretching a porous film obtained by a known vertical uniaxially stretching while relaxing in a vertical direction in a hot state.

PRIOR ART LIST

Patent Document

Patent Document 1: Japanese Patent Laid-Open No. 58-197659
Patent Document 2: Japanese Patent Laid-Open No. 58-59072
Patent Document 3: Japanese Patent Laid-Open No. 2001-122998
Patent Document 4: Japanese Patent Laid-Open No. 2003-192814
Patent Document 5: Japanese Patent No. 3003830
Patent Document 6: Japanese Patent Laid-Open No. 11-297297
Patent Document 7: Pamphlet of International Publication No. WO 2007/098339

SUMMARY OF INVENTION

Problem to be Solved by the Invention

However, regarding the polyolefin-based porous film obtained from the method of Patent Document 1, since the method is a method for obtaining a porous film by extracting a solvent from a raw fabric obtained by the extrusion method and does not include a stretching method in the steps, the obtained porous film is disadvantageous in that sufficient electric resistance cannot be obtained because of a small average pore size and productivity is low because an extraction step is needed. Moreover, both the porous films described in Patent Documents 2 to 6 and the porous films obtained from the methods described in Patent Documents 2 to 6 are disadvantageous in that sufficient electric resistance cannot be obtained. Furthermore, the method described in Patent Document 7 is disadvantageous in that a production speed is further decreased because vertical relax (contract) is performed simultaneously with transverse stretching, and facilities cost a lot because a simultaneous biaxial stretching machine specific for transverse stretching is needed.

In recent years, as a battery to be mounted on a hybrid electric vehicle (HEV) or an electric vehicle (EV), a lot of research on a lithium-ion secondary battery capable of being reduced in size has been made, and a separator having lower electric resistance (easiness of ion transmission) is required so as to improve performance such as higher power and higher capacity in addition to safety and reliability. However, there is a problem in that, when electric resistance is decreased, generally, a withstand voltage and mechanical strength are simultaneously decreased, thereby easily causing short-circuit between electrodes. Such a problem remains as a problem to be solved, specifically in a high-performance lithium-ion secondary battery.

Furthermore, there is a problem in that, when a speed of MD stretching is increased in a dry method so as to improve productivity of a film, a polyolefin porous film having sufficient air permeability cannot be obtained.

It is an object of the present invention to provide a polyolefin-based porous film which excels in electric resistance (ion permeability), air permeability, a withstand voltage, and mechanical strength, using excellent productivity of a dry method.

Means for Solving Problem

In order to decrease electric resistance of a polyolefin-based porous film (hereinafter, referred to simply as "porous film"), generally, a method for increasing porosity is used by increasing a stretching ratio or the like. However, a withstand voltage and mechanical strength became impaired by the method, and it was difficult to provide a porous film suitable for practical use. According to extensive research for solving the problem, it was found that a balance among electric resistance (ion permeability), a withstand voltage, and mechanical strength is improved by adopting at least one method selected from a method for making a pore surface area and birefringence of a polyolefin porous film be within a specific range, and a method for making birefringence of a non-porous raw fabric (before annealing treatment) be equal to or more than a specific value and making a pore surface area of the obtained polyolefin-based porous film be within a specific range.

Moreover, the present inventors made extensive research so as to produce a porous film having higher air permeability by a dry method with high productivity, and they found out that a cause of a reduction in air permeability of a porous film, which is generated when a speed of MD stretching is increased, is due to a reduction in a pore size in a film width direction (TD) by a reduction in the film width. It was found that, in order to prevent the reduction of air permeability associated with the reduction in the film width, restoring of the film width, which has been reduced by MD stretching, by TD stretching is effective.

It was also found the fact that a porous film with less contraction and higher dimensional stability could be obtained by setting a stretching temperature at this time to be lower than a general stretching temperature, which was unexpected from the common general technical knowledge.

Furthermore, it was found that a non-conventional porous film having high air permeability and dimensional stability can be obtained by performing thermal fixation at a temperature higher than the TD stretching temperature after the above-described TD stretching step, and therefore, the present invention was conceived.

That is, a first aspect of the present invention is as follows.

A method for producing a polyolefin-based porous film comprising:

an (A) step: a raw fabric forming step for forming a non-porous raw fabric from a polyolefin-based resin composition;

a (B) step: an MD cold stretching step for cold stretching the non-porous raw fabric obtained in the (A) step at a temperature of −20° C. to (Tm−30)° C. (Tm is a melting point (° C.) of the non-porous raw fabric) in an extruding direction (MD) of the raw fabric to make the raw fabric porous;

a (D) step: a TD cold stretching step for cold stretching a film processed in the (B) step in a direction (TD) perpendicular to the MD; and a (H) step: a thermal fixing step, in the above order, wherein a thermal fixing temperature $T_2$ (° C.) in the (H) step satisfies expressions (1) and (2) below;

$$T_2 > T_1 \quad (1)$$

$$(Tm-3) \geq T_2 \geq (Tm-40) \quad (2)$$

(in the expressions, $T_1$ represents a stretching temperature (° C.) in the (D) step, and Tm represents the melting point (° C.) of the non-porous raw fabric).

A second aspect of the present invention is as follows.

A polyolefin-based porous film made of a polyolefin-based resin composition has a pore surface area of 35.0 to 42.0 m²/g and birefringence of $2.0 \times 10^{-2}$ to $4.0 \times 10^{-2}$.

A third aspect of the present invention is as follows.

A method for producing a polyolefin-based porous film comprising:

an (A) step: a raw fabric forming step for forming a non-porous raw fabric from a polyolefin-based resin composition; and a (B) step: an MD cold stretching step for cold stretching the non-porous raw fabric obtained in the (A) step at a temperature of −20° C. to (Tm−30)° C. (Tm is a melting point (° C.) of the non-porous raw fabric) in an extruding direction (MD) of the raw fabric to make the raw fabric porous, wherein a birefringence of the non-porous raw fabric obtained in the (A) step is $3.0 \times 10^{-2}$ or more, and a pore surface area of the obtained polyolefin porous film is 42.0 m²/g or less.

Advantageous Effect of Invention

According to the first and second aspects of the present invention, a polyolefin-based porous film which excels in a physical property balance among electric resistance, a withstand voltage, and mechanical strength can be provided.

According to the third aspect of the present invention, a polyolefin-based porous film which excels in air permeability and dimensional stability can be produced with high productivity.

MODE FOR CARRYING OUT THE INVENTION

Figure 1:
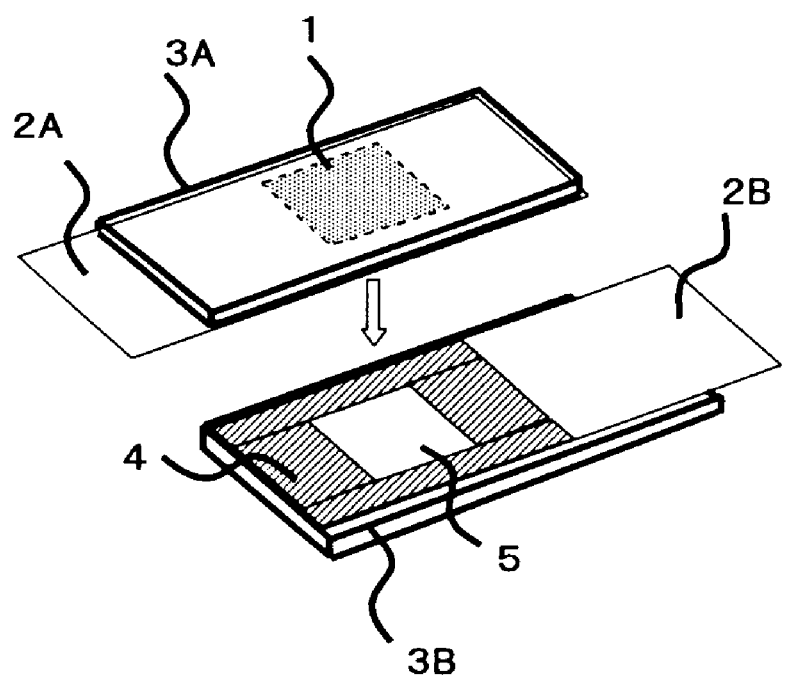
FIG. 1 is an explanatory diagram of a forming method of a sample used for a fuse short-circuit test.

Hereinafter, an embodiment for carrying out the present invention (hereinafter, referred to simply as "present embodiment") will be described in detail. However, the present invention is not limited to the following embodiment, and various changes may be made within the scope of the present invention.

(Polyolefin-Based Resin Composition)

In the present embodiment, a polyolefin-based resin composition means a polyolefin-based resin itself or a composition containing a polyolefin-based resin. A ratio of the polyolefin-based resin with respect to the total amount of a resin in the polyolefin-based resin composition is preferably 50 mass % or more, more preferably 80 mass % or more, still more preferably 90 mass % or more, and further preferably 95 mass % or more.

In addition, the polyolefin-based resin means a polymer containing olefin hydrocarbons as monomer components. In addition to a polymer made of only olefin hydrocarbons, the polyolefin-based resin also includes a copolymer of olefin hydrocarbons and monomers other than olefin hydrocarbons. In this case, a ratio of the copolymer of olefin hydrocarbon units is preferably 90 mass % or more, more preferably 95 mass % or more, and further preferably 99 mass % or more.

A melt flow index (hereinafter, abbreviated as "MI") of the polyolefin-based resin is preferably 0.05 to 3 g/10 min, more preferably 0.1 to 2 g/10 min, and further preferably 0.2 to 1 g/10 min. When the MI of the polyolefin resin is 0.05 g/10 min or more, it becomes easy to perform melt extrusion molding and drawing off at a high draft ratio. When the MI of the polyolefin-based resin is 3 g/10 min or less, birefringence (orientation) of a non-porous raw fabric is increased to a specific range, and therefore, the obtained porous film has a dense pore structure with a small pore size, and an effect of improving a withstand voltage and mechanical strength can be obtained.

The polyolefin-based resin used in the present embodiment is not limited, and examples thereof include polyethylene and polypropylene. Among them, a high-density polyethylene is suitably used because it excels in a stretching-opening property and productivity. Therefore, the polyolefin-based resin composition preferably contains a high-density polyethylene as a major component. The term "containing as a major component" means that a ratio of a polyolefin with respect to the total amount of the resin contained in the polyolefin resin composition is 80 mass % or more, and 90 mass % or more is more preferable and 95 mass % or more is further preferable.

A preferable range of a density of the high-density polyethylene is 0.958 to 0.965 g/cm$^3$, more preferably 0.959 to 0.964 g/cm$^3$, and further preferably 0.960 to 0.963 g/cm$^3$. By setting the density to be 0.958 g/cm$^3$ or more, an opening property is improved, and air permeability and electric resistance are improved. In contrast, by setting the density to be 0.965 g/cm$^3$ or less, a decrease in mechanical strength can be reduced.

Examples of the polyethylene include a polyethylene homopolymer and a polyethylene copolymer.

Examples of the polyethylene copolymer include propylene, 1-butene, 1-hexene, 4-methyl-1-pentene, 1-octene, and 1-decene as an olefin comonomer component other than an ethylene component. A content of a comonomer component other than an ethylene component is preferably 10 mol % or less, more preferably 5 mol % or less, and further preferably 2 mol % or less so as to obtain crystallinity suitable for stretching and opening. The structure thereof may be either a block copolymer or a random copolymer.

In addition, a weight-average molecular weight (Mw) and molecular weight distribution (Mw/Mn) of the polyethylene have an influence on birefringence (orientation) of the porous film, and as a result, have an influence also on mechanical strength and a withstand voltage. Specifically, the porous film excels in a withstand voltage and mechanical strength by setting birefringence of the porous film to be within a specific range, and a factor for controlling birefringence of the porous film is determined by birefringence of the non-porous raw fabric obtained in an extrusion molding step in the case where conditions of annealing treatment, stretching or the like for the non-porous raw fabric are constant. That is, when birefringence of the non-porous raw fabric is large, birefringence of the obtained porous film becomes large.

In addition to forming conditions, examples of a factor for influencing birefringence of the non-porous raw fabric include a weight-average molecular weight and molecular weight distribution of a polyethylene contained in the polyolefin-based resin composition constituting the non-porous raw fabric. The preferable range of the weight-average molecular weight is 100000 or more, more preferably 150000 or more, still more preferably 180000 or more, and further preferably 200000 or more. Accordingly, a highly-oriented non-porous raw fabric is obtained, and birefringence of the porous film can be within a specific range. As a result, many pore structures with a small pore size are formed, and a withstand voltage and mechanical strength (for example, puncture strength) of the porous film are improved.

An upper limit of the weight-average molecular weight is preferably 400000 or less, more preferably 300000 or less, and further preferably 250000 or less, from the viewpoint of extrusion moldability.

In the present embodiment, the molecular weight distribution is not specifically limited, and for example, it may be within the range of approximately 3 to 50. Since birefringence of the porous film can be more increased by enlarging the molecular weight distribution, the molecular weight distribution is preferably 8 or more, more preferably 10 or more, and further preferably 13 or more.

It is to be noted that, in the present description, a weight-average molecular weight (Mw) and a number-average molecular weight (Mn) are values obtained by a GPC (gel permeation chromatography) method using polystyrene as a standard substance.

As the polypropylene, an isotactic homopolypropylene having an isotactic pentad fraction of 95% or more is preferable from the viewpoint of a stretching-opening property. The isotactic pentad fraction in a polypropylene component is a ratio of a chain (mmmm) in which all of five adjacent methyl groups are oriented in the same direction with respect to the whole of a polypropylene molecular chain, and is evaluated as a (mmmm) peak fraction in a total absorption peak of a methyl carbon region measured by $^{13}$C-NMR. Assignment of signals to a methyl group region including the isotactic pentad is based on A. Zambellietal. (Macromolecules 8, 687 (1975)).

The weight-average molecular weight (Mw) of the polypropylene is preferably 300000 to 1000000, more preferably 400000 to 900000, and further preferably 500000 to 800000 in consideration of a TD cold stretching property, mechanical strength, and formability. In addition, the molecular weight distribution (Mw/Mn) obtained from the weight-average molecular weight (Mw) and the number-average molecular weight (Mn) is not specifically limited, and for example, may be 3 to 50.

As for the polyolefin-based resin composition, in addition to the high-density polyethylene and the isotactic homopolypropylene, other polyolefin-based resins and modified materials such as various elastomers may be blended.

Examples of the other polyolefin-based resins include poly-1-butene, poly-4-methyl-1-pentene, ethylene-α-polyolefin copolymer and the like.

In the case where the high-density polyethylene is used as a major component, a low-density polyethylene and a polypropylene can be exemplified. In the case where the isotactic homopolypropylene is used as a major component, a high-density polyethylene, a low-density polyethylene, and a random/block polypropylene containing a comonomer component such as ethylene can be exemplified.

In addition to a styrene-based elastomer such as SEBS and SEPS, examples of the various elastomers include an ethylene-α-polyolefin copolymer elastomer.

These other polyolefin resins and the modified materials are used alone or by blending two or more kinds thereof. In this case, a blending quantity of the respective resins may be a purpose-designed blending quantity insofar as necessary physical properties such as air permeability are not inhibited.

Furthermore, in addition to the above-described materials, known additives such as an antioxidant, a light stabilizer, a lubricant, and an antistat may be used, and an additive amount thereof may be a purpose-designed additive amount insofar as necessary physical properties such as electric properties and mechanical properties are not inhibited.

[Producing Method]

In the present embodiment, a polyolefin-based porous film can be produced by a dry method. Hereinafter, a producing method using the dry method will be described.

In the present embodiment, the producing method using the dry method includes (A) a raw fabric forming step for forming a non-porous raw fabric, and (B) an MD cold stretching step for cold stretching the non-porous raw fabric in an MD.

In addition to these steps, one or more kinds of steps selected from the group consisting of (F) an annealing treatment step for annealing the non-porous raw fabric, (C) an MD heat stretching step for heat stretching a film in the MD, (G) an MD thermal fixing step for thermal fixing the film in the MD, (D) a TD cold stretching step for cold stretching the film in a TD, and (H) a thermal fixing step for thermal fixing the film processed in the TD cold stretching step may be included.

Moreover, in the present embodiment, (I) a surface treatment step for performing surface treatment on the film or (J) a coating step for coating another layer such as a heat resistant layer on the porous film may be included.

The MD means an extruding direction when the raw fabric is extruded in the (A) raw fabric forming step, and the TD means a direction perpendicular to the MD.

((A) Raw Fabric Forming Step)

Although a method for forming the polyolefin-based resin composition is not limited, for example, the raw fabric can be formed by melt kneading the polyolefin resin composition by an uniaxial or biaxial extruder, extruding the film in a molten state by a T-die, a circular die or the like, and drawing off the film by a cast roll or a draw-off roll. In this case, the resin composition in a molten stage is desirably quenched and solidified using an air knife, an airing arrangement or the like. Accordingly, crystal lamellae which is important for forming pores can be regularly and minutely arranged.

Moreover, although a draft ratio ((draw-off speed of cast roll)/(flow rate of resin from die lip, which is calculated based on density)) when drawing off the molten resin composition flowing out from the die with the roll is not limited, for example, it may be 10 to 600 times, more preferably 20 to 500 times, and further preferably 30 to 400 times, from the viewpoint of air permeability and formability. When the draft ratio is 10 times or more, the porous film which excels in air permeability can be obtained, and when the draft ratio is 600 times or less, the molten resin flowing out from the die becomes easy to be stably drawn off.

Furthermore, by setting the draft ratio to be within the range of 50 to 600 times, and preferably 150 to 600 times, birefringence of the obtained non-porous raw fabric can be within the preferable range described below, and therefore, birefringence of the stretched and opened porous film can be within the range of $2.0 \times 10^{-2}$ to $4.0 \times 10^{-2}$. However, since a relationship between the draft ratio and birefringence is influenced by the kind of the resin contained in the resin composition, elongational viscosity when the resin composition flows out from the T-die, and the like, the above-described draft ratio is just an indication. Eventually, the draft ratio is preferably optimized by repeating experiments while measuring birefringence of the obtained non-porous raw fabric.

In the present embodiment, birefringence of the non-porous raw fabric obtained in the (A) step is preferably $3.0 \times 10^{-2}$ or more, more preferably $3.0 \times 10^{-2}$ to $4.5 \times 10^{-2}$, still more preferably $3.1 \times 10^{-2}$ to $4.0 \times 10^{-2}$, and further preferably $3.2 \times 10^{-2}$ to $3.8 \times 10^{-2}$. When birefringence of the non-porous raw fabric is $3.0 \times 10^{-2}$ or more, the porous film to be obtained therefrom has a dense pore structure with a small pore size, and an effect of improving a withstand voltage can be obtained. As a result, a balance between electric resistance and a withstand voltage can be improved. In addition, the non-porous raw fabric having birefringence of approximately $4.5 \times 10^{-2}$ or less can be produced without increasing so much the draft ratio of the resin composition which flows out from the T-die, the resin can be stably drawn off in forming the non-porous raw fabric.

In the present embodiment, birefringence means a difference between a refractive index of the MD and a refractive index of the TD (MD–TD) with respect to light having a wavelength of 590 nm.

Birefringence is an index indicating anisotropy of an object, and in the case of a crystalline resin, the birefringence is obtained from the sum of characteristic birefringence derived from a crystalline structure (crystal lamellae) in a crystalline phase and birefringence derived from orientation of molecules in an amorphous phase. The birefringence of the non-porous raw fabric in the present embodiment is influenced by both of the crystalline phase and the amorphous birefringences. In the crystalline phase, by increasing regularity of alignment of the crystal lamellae from a disordered state following an increase in the draft ratio, a value of the birefringence approaches the characteristic value of the crystalline structure (crystal lamellae). Moreover, in the amorphous phase, by increasing molecular orientation in the MD following an increase in the draft ratio, a value of the birefringence is proportional to the orientation to be increased. However, when the orientation is increased too much, fracture is generated. Therefore, the range of the birefringence is preferably approximately $4.5 \times 10^{-2}$ or less so as not to generate fracture.

Generally, electric resistance and a withstand voltage are in a trade-off relationship. For example, by further increasing a stretching ratio of any of an MD cold stretching ratio, an MD heat stretching ratio, and a TD cold stretching ratio, a pore size of the obtained porous film is increased, and electric resistance can be decreased. On the other hand, performance degradation of a withstand voltage is caused, and therefore, it was considered to be difficult to highly keep a balance between both of them. However, in the porous film obtained by forming the non-porous raw fabric such that the birefringence is $3.0 \times 10^{-2}$ or more and a pore surface area described below is within a specific range, a withstand voltage is improved by forming a denser pore structure. Accordingly, a balance between electric resistance and a withstand voltage, which could not be achieved in the past, can be achieved.

In the present embodiment, the non-porous raw fabric and the porous film obtained by stretching and opening the non-porous raw fabric may be a single layer or may have a multilayered structure in which plural layers made of different polyolefin-based resin compositions are laminated. In this case, if glass-transition temperatures and melting points of the polyolefin-based resin compositions constituting the respective layers are different, the following values are applied as Tg, and Tm.

Glass-Transition Temperature Tg: the highest value when measuring Tg of a single layer produced by using the polyolefin resin compositions constituting the respective layers.

Melting Point Tm: the lowest value when measuring Tm of the single layer produced by using the polyolefin resin compositions constituting the respective layers.

((F) Annealing Treatment Step)

In the present embodiment, annealing treatment is preferably performed before the step for MD cold stretching the non-porous raw fabric ((B) step). By performing the annealing treatment of the non-porous raw fabric in the annealing treatment step, crystallinity of the non-porous raw fabric can be increased, and the porous film which further excels in air permeability and electric resistance can be obtained. Moreover, since crystallinity of the non-porous raw fabric can be increased, and the porous film which further excels in air permeability and electric resistance can be obtained by increasing a temperature of the annealing treatment, the annealing treatment is preferably performed at high temperature. However, excessive heat treatment makes that resin melt to cause trouble. Therefore, a temperature range of the annealing treatment is preferably (Tm−3° C.) to (Tm−30° C.), and more preferably (Tm−5° C.) to (Tm−20° C.). Tm represents a melting point (° C.) of the non-porous raw fabric before the annealing treatment.

In addition, the annealing treatment may be performed by a continuous method or a batch method. In the case where the annealing treatment is continuously performed, treating time is preferably 0.5 minutes or more, more preferably 1 minute or more, and further preferably 2 minutes or more from the viewpoint of effectively exerting an effect of the annealing treatment. Moreover, in the case where the annealing treatment is performed by the batch method, in particular, in the case where the annealing treatment is performed with the non-porous raw fabric wound around the roll, treating time is preferably appropriately changed based on a diameter of the roll when the non-porous raw fabric is wound. In order to determine annealing treating time, it is preferable that, for example, principal properties such as air permeability of an outer layer and an inner layer (winding core side) of the wound non-porous raw fabric be measured by changing treating time, and treating time when a difference between the outer layer and the inner layer of the non-porous raw fabric disappears be evaluated.

((B) MD Cold Stretching Step)

In the present embodiment, by performing cold stretching in the MD with respect to the non-porous raw fabric (in the case of performing annealing treatment, non-porous raw fabric processed in the annealing treatment step), a crack is generated in the non-porous raw fabric to form pores therein. It is preferable that plural rolls be used in the cold stretching. A stretching ratio in this case is preferably 1.05 to 3.0 times, more preferably 1.1 to 2.5 times, and further preferably 1.2 to 2.0 times. By setting the MD cold stretching ratio to be within the range, birefringence, a pore surface area, and the like of the obtained porous film can be controlled to be within an appropriately range, and the porous film which excels in a balance between a withstand voltage with respect to electric resistance and mechanical strength can be obtained. Furthermore, by setting the MD cold stretching ratio to be within the range, air permeability of the porous film and appearance (pinhole and the like) are improved, and stability of stretching is also improved.

The MD cold stretching ratio (times) is determined by the following expression.

$$\text{MD cold stretching ratio (times)} = V_2/V_1$$

Here, in the expression, $V_1$ represents a roll speed (m/min) before cold stretching, and $V_2$ represents a roll speed (m/min) at the completion of cold stretching.

A stretching temperature in the MD cold stretching step is preferably −20° C. to (Tm−30° C.), more preferably −20° C. to (Tm−50° C.), still more preferably 0° C. to (Tm−50° C.), further preferably 0° C. to (Tm−60° C.), and especially preferably 10° C. to (Tm−70° C.). When the stretching temperature is −20° C. or more, fracture of the film can be effectively prevented. When the stretching temperature is (Tm−30° C.) or less, the porous film which further excels in air permeability and electric resistance can be obtained.

In the case where the MD cold stretching is performed using plural rolls, a stretching speed between the rolls (in the case of performing multi-stage stretching at different stretching speeds, an average value of stretching speeds between the respective rolls) is preferably within a range of 20 to 10000%/min, more preferably 50 to 5000%/min, and further preferably 80 to 3000%/min. When the stretching speed is 20%/min or more, productivity of the porous film is further improved. When the stretching speed is 10000%/min or less, the porous film which further excels in air permeability and electric resistance can be obtained. In the present embodiment, the stretching speed is determined by the following expression.

$$\text{MD cold stretching speed (\%/min)} = S_1/\{2 \cdot L_1/(V_1 + V_2)\}$$

Here, $S_1$ represents stretching ratio (%)=$(V_2/V_1 − 1) \times 100$, $V_1$ represents a roll speed (m/min) before cold stretching, $V_2$ represents a roll speed (m/min) after cold stretching, and $L_1$ represents a stretching distance (m) between rolls.

((C) MD Heat Stretching Step)

By performing, after the MD cold stretching step ((B) step), heat stretching in the MD with respect to the cold stretched porous film in which a crack is generated, a pore size of the crack in the MD direction is enlarged, and the crack can be fixed. Therefore, in the present embodiment, the (C) MD heat stretching step is preferably included. A stretching ratio in this case is preferably 1.5 to 3 times, more preferably 1.8 to 2.8 times, and further preferably 2.0 to 2.6 times.

By setting the MD heat stretching ratio to be 1.5 times or more, air permeability can be improved, and by setting the MD heat stretching ratio to be 3.0 times or less, generation of a pinhole or fracture can be further suppressed.

In the present embodiment, the MD heat stretching ratio (times) is determined by the following expression.

$$\text{MD heat stretching ratio (times)} = V_4/V_3$$

Here, in the expression, $V_3$ represents a roll speed (m/min) before heat stretching, and $V_4$ represents a roll speed (m/min) at the completion of heat stretching.

In addition, a stretching temperature in the MD heat stretching step is preferably (Tm−40° C.) to (Tm−5° C.), more preferably (Tm−35° C.) to (Tm−5° C.), and further preferably (Tm−30° C.) to (Tm−5° C.). When the stretching temperature is (Tm−40° C.) or more, air permeability is further improved. Moreover, when the stretching temperature is (Tm−5° C.) or less, generation of a pinhole, fracture, roll fusion and the like can be further suppressed.

Further, in the case where the heat stretching is performed in the MD using plural rolls, a stretching speed between the rolls (in the case of performing multi-stage stretching at different stretching speeds, an average value of stretching speeds between the respective rolls) is preferably within a range of 20 to 10000%/min, more preferably 50 to 5000%/min, and further preferably 80 to 3000%/min. Similar to the MD cold stretching, when the stretching speed is 20%/min or more, productivity of the porous film is further improved.

When the stretching speed is 10000%/min or less, the porous film which further excels in air permeability and electric resistance can be obtained.

The heat stretching speed (%/min) in the present embodiment is determined by the following expression.

$$\text{MD heat stretching speed (\%/min)} = S_2/\{2 \cdot L_2/(V_3+V_4)\}$$

Here, $S_2$ represents MD heat stretching ratio (%)=$(V_4/V_3-1) \times 100$, $V_3$ represents a roll speed (m/min) before heat stretching, $V_4$ represents a roll speed (m/min) after heat stretching, and $L_2$ represents a stretching distance (m) between rolls.

((G) MD Thermal Fixing Step)

In order to reduce a bowing phenomenon (distortion generated in stretching) generated in a tenter in the case of adopting thermal contraction in the MD or the (D) TD cold stretching step described below, the present embodiment desirably includes the MD thermal fixing step for performing thermal fixation by performing heating treatment at a temperature of equal to or more than the stretching temperature in the MD heat stretching step with respect to the film processed in the MD heat stretching step without substantially stretching. In the MD thermal fixing step, it is effective to relax (contract) the film in the MD so as not to cause poor appearance such as a wrinkle by providing a speed difference between plural rolls, from the viewpoint of suppressing thermal contraction of the porous film in the MD.

((D) TD Cold Stretching Step)

In the present embodiment, the TD cold stretching step is preferably included. In particular, stretching in the TD is performed with respect to the film processed in the (C) MD heat stretching step using stretching equipment such as a tenter. Specifically, cold stretching is performed only in the TD with respect to the film processed in the above-described respective steps (A), (F), (B), (C), and (G). By stretching in the TD, uniform TD stretching can be performed, the pore size of the film in the TD is increased, and an average pore size can be made larger than that of a porous film obtained by a vertical (MD) uniaxially stretching. As a result, excellent air permeability and electric resistance can be imparted to the porous film, the film which has puncture strength superior to that of a vertical uniaxially-stretched film having the same air permeability can be obtained, and a speed increase can be achieved in terms of productivity.

For example, stretching in the TD is performed using uniaxially tenter equipment.

A stretching ratio in the TD in the TD cold stretching step is preferably 1.05 to 2.0 times, more preferably 1.10 to 1.5 times and more, and further preferably 1.15 to 1.3 times. When the stretching ratio is 1.05 times or more, air permeability of the porous film is further improved. When the stretching ratio is 2.0 times or less, film fracture and TD stretching unevenness in the TD stretching become difficult to be generated.

In addition, by setting the stretching ratio to be within the above-described range, birefringence, a pore surface area, and the like of the obtained porous film can be controlled to be within an appropriately range, and the porous film which excels in a balance among electric resistance, a withstand voltage, and mechanical strength can be obtained.

In addition, a stretching temperature $T_1$ (° C.) when performing stretching in the TD is preferably $(Tg+20) \leq T_1$, more preferably $(Tg+30) \leq T_1$, and further preferably $(Tg+40) \leq T_1$. Moreover, the stretching temperature $T_1$ is preferably $T_1 \leq (Tm-20)$, more preferably $T_1 \leq (Tm-30)$, and further preferably $T_1 \leq (Tm-40)$. Here, Tg represents a glass-transition temperature (° C.) of the porous film to be subjected to the TD cold stretching.

Since it is known that, in stretching a resin film, the higher stretching temperature becomes difficult for stress to remain on the film and dimensional stability of the obtained film is improved, the stretching is generally performed at a high-temperature region near a melting point. However, unexpectedly, it was found that, in the case of the TD stretching after the non-porous raw fabric formed from the polyolefin-based resin composition is MD stretched to form pores therein, the porous film whose dimensional stability is improved can be obtained by setting the stretching temperature to be the above-described value lower than a general stretching temperature. Such a phenomenon (effect) is prominently confirmed in the case where the film is formed from the polyolefin resin composition containing a polyethylene as a major component.

In the case where the TD stretching of a highly-oriented film is performed at a high draft ratio at a temperature near the melting point so as to obtain the non-porous raw fabric, a network of a molecular chain in the TD direction in the resin is poor, and problems such as stretching unevenness and fracture may be caused due to local flowage. Therefore, based on this viewpoint, in order to uniformly and stably perform the TD stretching, it is important that the TD stretching is performed under conditions where the molecule network in the TD direction can sufficiently withstand stress generated in the TD stretching. Within the above-described preferable temperature range of the TD stretching, the polyolefin resin is in a rubber state which is deformable by stretching and has an entanglement density of the molecule chain, which can withstand stress generated in the stretching. Therefore, the stretching in the TD can be uniformly and stably performed.

In the case of the polyolefin porous film containing mainly a polypropylene, as described above, by performing the present step at a temperature where the molecule network becomes dense, that is, within the range of the TD cold stretching temperature of the present invention, TD stretching unevenness is suppressed, and a biaxially-stretched porous film having uniformity higher than that of a conventional art can be stably produced.

Although air permeability and electric resistance are not influenced by a speed when performing the stretching in the TD, in the present embodiment, the speed is preferable fast from the viewpoint of efficient productivity. However, if the stretching speed is too fast, film fracture may be generated near a tenter clip. Therefore, the stretching speed is preferably 10 to 5000%/min, more preferably 50 to 4000%/min, and further preferably 100 to 3000%/min.

The TD cold stretching speed (%/min) in the present embodiment is determined by the following expression.

$$\text{TD cold stretching speed (\%/min)} = V_3 \times ((W_2/W_1)-1) \times 100/L_2$$

Here, in the expression, $W_2$ represents a TD dimension between gauge lines (unit: m) after TD cold stretching in the TD cold stretching step, $W_1$ represents a TD dimension between gauge lines (unit: m) before TD cold stretching in the TD cold stretching step, $V_3$ represents a tenter line speed (unit: m/min), and $L_2$ represents a TD cold stretching distance (unit: m).

((H) Thermal Fixing Step)

In order to suppress thermal contraction in the TD, the present embodiment desirably includes the thermal fixing step for thermal fixing in the TD by performing heating treatment with respect to the film processed in the (D) TD cold stretching step without substantially stretching. It is to be noted that, in the present step, not only the TD but also the MD is substantially thermally fixed.

A thermal fixing temperature $T_2$ (° C.) in this case is preferably $(Tm-40) \leq T_2 \leq (Tm-3)$, more preferably $(Tm-35) \leq T_2 \leq (Tm-3)$, still more preferably $(Tm-30) \leq T_2 \leq (Tm-3)$, and further preferably $(Tm-30)$ to $(Tm-5)$, from the viewpoint of suppressing thermal contraction in the TD and film fracture. Here, Tm represents a melting point (° C.) of the non-porous raw fabric. In the case of using the polyolefin resin composition containing a polyethylene as a major component, $(Tm-15) \leq T_2 \leq (Tm-3)$ is preferable. In the case of using the polyolefin resin composition containing a polypropylene as a major component, $(Tm-40) \leq T_2 \leq (Tm-20)$ is preferable.

Moreover, a relationship between the thermal fixing temperature $T_2$ (° C.) and the stretching temperature $T_1$ (° C.) in the (D) TD cold stretching step is preferably $T_2 \geq T_1$, more preferably $T_2 > T_1$, still more preferably $T_2 \geq (T_1+1)$, further preferably $T_2 \geq (T_1+5)$, especially preferably $T_2 \geq (T_1+20)$, and most preferably $T_2 \geq (T_1+50)$. Although an upper limit of $T_2$ is not specifically limited, $T_2 \leq (T_1+150)$ is preferable.

In the thermal fixing step, only the thermal fixation may be performed by performing heating treatment with respect to the wound film off-line, or thermal fixing relaxation for relaxing (contracting) the film in the TD at the same time with the thermal fixation can be performed from the viewpoint of effectively suppressing thermal contraction in the TD.

In the case of performing in transverse uniaxially tenter equipment, thermal fixing relaxation can be performed in the TD with the film held by a tenter clip.

Moreover, a heating roll is arranged, and the thermal fixation may be performed by making the film pass over the roll. In this case, one roll may be used, or plural rolls are arranged and thermal fixing relaxation can be performed in the TD and in the MD using a speed difference between the rolls and a distance between the rolls. Furthermore, the thermal fixation may be performed using a large drying oven.

In the case where the thermal fixing relaxation is performed in the thermal fixing step, a TD relaxation ratio is determined by the following expression.

TD relaxation ratio (%)=$W_3/W_2 \times 100$

Here, in the expression, $W_2$ represents a TD dimension between gauge lines (unit: m) after TD cold stretching, and $W_3$ represents a TD dimension between gauge lines (unit: m) after thermal fixation.

((I) Surface Treatment)

In the present embodiment, in order to improve affinity of the porous film with a coating agent, a solvent, and the like, hydrophilic treatment can be preferably performed to the film processed in the (H) thermal fixing step using known techniques such as a corona discharge treatment machine, a plasma treatment machine, an ozone treatment machine, and a flame treatment machine.

((J) Coating)

In the present embodiment, coating can be preferably performed on at least one surface of the porous film to which the hydrophilic treatment is performed.

For example, a heat resistant porous layer composed of inorganic fillers (fine particles) and a binder may be arranged on one surface of the porous film. In this case, the binder is used in order to bond the inorganic fillers each other, and to bond the inorganic fillers and the surface of the porous layer.

In addition, a known technique can be used for forming the heat resistant porous layer. For example, the heat resistant porous layer can be formed by the method disclosed in Japanese Patent Laid-Open No. 2011-832, and the heat resistant porous film obtained therefrom excels in heat resistance, and safety and reliability of a secondary battery can be further improved.

According to the above-described producing method, a polyolefin-based porous film which excels in a balance between a withstand voltage and electric resistance, compared to the conventional known technique, can be produced. Moreover, according to the present embodiment, by performing the stretching in the TD, mechanical strength is improved compared to a porous film obtained by uniaxially stretching. As a result, the porous film can be suitably used as a separator for a high-performance secondary battery, which is required to have higher safety and battery performance.

Figure 4:
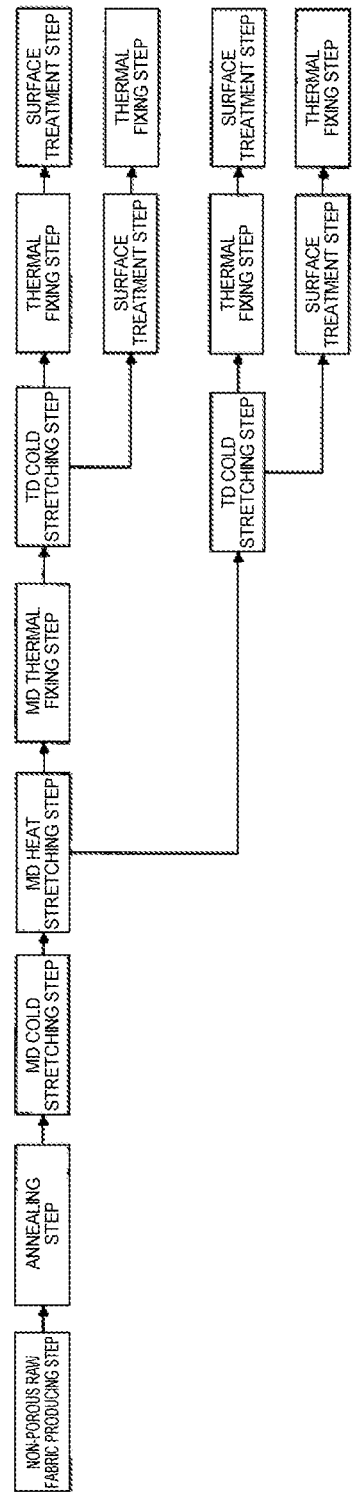
FIG. 4 is a chart showing a specific example of the order of respective steps in a producing method of the present embodiment.

The producing method which can be employed to the present embodiment has been described above, but the producing method of the polyolefin-based porous film is not limited thereto. For example, the order of the respective steps may be that as shown in FIG. 4.

[Various Properties of Polyolefin-Based Porous Film]

(Film Width Retention Ratio)

In the present embodiment, a film width retention ratio based on the non-porous raw fabric of the obtained polyolefin-based porous film before the MD stretching is preferably 90 to 150%, more preferably 95 to 140%, and further preferably 100 to 130%. When the film width retention ratio is 90% or more, air permeability is improved. When the film width retention ratio is 120% or less, stretching unevenness and film fracture can be prevented. Here, the film width retention ratio is determined by the following expression.

film width retention ratio (%)=$W/W_0 \times 100$

In the above-described expression, $W_0$ represents a TD dimension between gauge lines (unit: m) of the non-porous raw fabric before MD cold stretching, and W represents a TD dimension between gauge lines (unit: m) of the obtained polyolefin-based porous film.

(Thickness)

In the present embodiment, a thickness of the polyolefin-based porous film is not specifically limited as long as it has a thickness for its intended use. The thickness is generally 5 to 50 μm, more preferably 8 to 40 μm, and further preferably 10 to 30 μm.

(Air Permeability)

In the present embodiment, air permeability of the polyolefin porous film is not specifically limited. However, in consideration of a balance with various physical properties, it is preferably 10 to 600 sec/100 cc, more preferably 30 to 500 sec/100 cc, still more preferably 50 to 500 sec/100 cc, further preferably 50 to 400 sec/100 cc, and especially preferably 100 to 400 sec/100 cc, when the film thickness is converted into 20 μm (that is, measured air permeability×(20/actual thickness (μm) of film)). The air permeability is measured by the method described in the following Examples.

(Porosity)

In the present embodiment, porosity of the polyolefin-based porous film is not specifically limited. However, in consideration of a balance with various physical properties, the porosity is preferably 40 to 80%, more preferably 45 to 75%, and further preferably 50 to 70%. The porosity is measured by the method described in the following Examples.

(Electric Resistance)

In the present embodiment, electric resistance of the polyolefin-based porous film is not specifically limited. However, in consideration of a balance with a withstand voltage, it is preferably 1.0 Ω·cm² or less, more preferably 0.5 Ω·cm² or less, and further preferably 0.3 Ω·cm² or less, when the film thickness is converted into 20 μm (that is, measured electric resistance×(20/actual thickness (μm) of film)). The electric resistance is measured by the method described in the following Examples.

(Withstand Voltage)

In the present embodiment, withstand voltage of the polyolefin-based porous film is not specifically limited. However, in consideration of a balance with electric resistance, it is preferably 1.2 kV or more, more preferably 1.5 kV or more, and may be 1.8 kV or more, when the film thickness is converted into 20 μm (that is, measured withstand voltage×(20/actual thickness (μm) of film)). The withstand voltage is measured by the method described in the following Examples.

(Maximum Pore size)

A maximum pore size (mode diameter) of the polyolefin-based porous film of the present embodiment has an influence on electric resistance and a withstand voltage, and is preferably 0.2 to 0.5 μm, more preferably 0.25 to 0.45 μm, and further preferably 0.3 to 0.4 μm. When the maximum pore size is 0.2 μm or more, electric resistance can be reduced. When the maximum pore size is 0.5 μm or less, a withstand voltage can be increased to a practical level. In addition, the maximum pore size can be controlled by stretching conditions such as an MD cold stretching ratio, an MD heat stretching ratio, and a TD cold stretching ratio. The maximum pore size is measured by the method described in the following Examples.

(Puncture Strength)

In the present embodiment, puncture strength of the polyolefin-based porous film is not specifically limited as long as it has a puncture strength required for its intended use. Generally, a value for the film thickness converted into 20 μm (that is, measured puncture strength×(20/actual thickness (μm) of film)) of 2.0 N or more has no problem when using as a battery separator, but the puncture strength is preferably 2.5 N or more, and further preferably 3.0 N or more. The puncture strength is measured in accordance with the method described in the following Examples.

According to the above-described producing method of the porous film, a polyolefin-based porous film having higher air permeability compared to the well-known conventional technique can be obtained. Accordingly, ion permeability can be improved. Furthermore, in the case of performing thermal fixation at a higher temperature than that of the TD cold stretching after performing the TD cold stretching at a lower temperature than that of a general stretching permeability is improved and the porous film having further improved dimensional stability can be obtained. For example, when it is used for a separator for a lithium-ion secondary battery having a high energy density, both safety and reliability are improved.

(Pore Surface Area)

In the present embodiment, a pore surface area of the polyolefin-based porous film has an influence on electric resistance and a withstand voltage.

The pore surface area of the polyolefin-based porous film is preferably 42.0 m²/g or less, more preferably 35.0 to 42.0 m²/g, further preferably 36.0 to 41.5 m²/g, and especially preferably 37.0 to 41.0 m²/g.

When the pore surface area is 35.0 m²/g or more, electric resistance of the porous film can be reduced. In contrast, although the polyolefin-based porous film whose withstand voltage is improved can be obtained in the present embodiment, when the pore surface area is too large, a withstand voltage is reduced and it was found that advantages of the present embodiment cannot be taken sufficiently. However, when the pore surface area is 42.0 m²/g or less, a withstand voltage can be increased to a practical level.

The pore surface area of the porous film can be controlled by stretching conditions such as orientation of the non-porous raw fabric, an MD stretching ratio, and a TD stretching ratio described above. The pore surface area is measured by the method described in the following Examples.

(Birefringence)

In the present embodiment, in addition to by setting the pore surface area of the polyolefin-based porous film to be within the above-described range, by setting birefringence to be within a specific range, the porous film which excels in a balance among electric resistance, a withstand voltage, and mechanical strength can be obtained.

The birefringence of the polyolefin-based porous film can be controlled by conditions such as the kind of a polymer (polyolefin-based resin) contained in the polyolefin resin composition constituting the porous film (ease of being oriented), a draft ratio in the raw fabric forming step, an MD stretching ratio, and a TD stretching ratio, and is preferably $2.0 \times 10^{-2}$ to $4.0 \times 10^{-2}$, more preferably $2.3 \times 10^{-2}$ to $3.5 \times 10^{-2}$, and further preferably $2.5 \times 10^{-2}$ to $3.0 \times 10^{-2}$. When the birefringence is $2.0 \times 10^{-2}$ or more, a withstand voltage and mechanical strength are improved. When the birefringence is $4.0 \times 10^{-2}$ or less, formability of the non-porous raw fabric and stability in a vertical stretching step are improved.

(TD Stretching Unevenness)

In the present embodiment, stretching unevenness of the polyolefin-based porous film is not specifically limited as long as it has a required stretching unevenness for its intended use. Generally, since it has an influence on various physical properties, a thickness difference as an index of the stretching unevenness is preferably 30% or less, more preferably 20% or less, and further preferably 10% or less. The TD stretching unevenness is measured in accordance with the method described in the following Examples.

In the present embodiment, the polyolefin-based porous film may be composed of a single layer or multiple layers as described above. Moreover, the single layer or multiple layers polyolefin-based porous film may be used alone or as a multilayered porous film by laminating another layer such as a heat resistant layer.

Heretofore, the embodiment for carrying out the present invention has been described, however, the present invention is not limited to the above-described embodiments.

It is to be noted that the above-described respective measurement values of parameters are measured in the same manner as measuring methods in the following Examples unless otherwise noted.

EXAMPLES

Hereinafter, the present embodiment will be described more specifically with reference to Examples and Comparative Examples. However, the present embodiment is not limited to the following Examples unless departing from the scope of the present embodiment. It is to be noted that methods for measuring various physical properties and for producing the porous film are as follows.

(Thickness)

A thickness of the porous film was measured using a dial gauge in accordance with JIS K 7130 (1992) A-2 method.

(Glass-Transition Temperature Tg)

A glass-transition temperature Tg of the non-porous raw fabric (before annealing treatment) was measured using a viscoelastic spectrometer (product name "EXSTAR DMS6100", manufactured by SII NanoTechnology Inc.). A peak top temperature of a loss elastic modulus E" was measured at a tension mode (rate of temperature increase=2° C./min, frequency=1 Hz), and it was determined as the glass-transition temperature Tg (° C.).

(Melting Point Tm)

A melting point of the non-porous raw fabric (before annealing treatment) was measured using a differential scanning calorimeter (product name, "EXSTAR6000", manufactured by SII NanoTechnology Inc.). A top temperature of a melting peak when heating at a rate of temperature increase of 10° C./min was measured, and it was then determined as the melting point Tm.

(Air Permeability)

Air permeability resistance of the porous film was measured using a Gurley air permeability meter (manufactured by Toyo Seiki Seisaku-Sho, Ltd.) in accordance with JIS P-8117. The measurement value converted for 20 μm in the film thickness was determined as the air permeability.

(Maximum Pore Size, Pore Surface Area)

A maximum pore size (mode diameter) and a pore surface area were measured by a mercury intrusion technique using a pore distribution measuring apparatus (product name "Auto Pore 9520 type" manufactured by Shimadzu Corporation).

(Electric Resistance)

Electric resistance was measured by applying an alternating voltage between electrodes with a mixture of propylene carbonate and ethylene carbonate (capacity ratio: 50/50) as an electrolyte be sufficiently penetrated into a sample. The measurement value converted for 20 μm in the film thickness was determined as the electric resistance. The evaluation was conducted in accordance with the following criteria.

more than 1.5 Ω·cm$^2$: x
1.5 Ω·cm$^2$ or less: Δ
1.0 Ω·cm$^2$ or less: ○
0.5 Ω·cm$^2$ or less: ⊚

(Withstand Voltage)

The measurement was performed by sandwiching the porous film with aluminum electrodes each having a diameter of 3 cm, applying a load of 15 g thereon, and connecting it to a withstand voltage measuring apparatus (TOS9201) manufactured by Kikusui Electronic Corp. As a measurement condition, an alternating voltage (60 Hz) was applied at a rate of 1.0 kV/sec and a voltage value when short circuit was caused was measured. The measurement value converted for 20 μm in the film thickness was determined as the withstand voltage. The evaluation was conducted in accordance with the following criteria.

more than 1.5 kV: ⊚
1.5 kV or less: ○
1.0 kV or less: Δ
0.5 kV or less: x (Puncture Strength)

Puncture strength was measured using a handy-type compression tester (product name "KES-G5") manufactured by Kato Tech Co., Ltd. under conditions of a curvature radius of a point of a needle of 0.5 mm and a puncture speed=2 mm/sec. The measurement value converted for 20 μm in the film thickness was determined as the puncture strength. The evaluation was evaluated in accordance with the following criteria.

more than 2.5 N: ⊚
2.5 N or less: ○
2.0 N or less: Δ
1.5 N or less: x (Birefringence)

The measurement was performed using a phase difference measuring apparatus (product name "KOBRA21-ADH" manufactured by Oji Scientific Instruments) at a measuring wavelength of 590 nm. In the case where the porous film is measured, the measurement was performed by applying silicone oil (dimethylsiloxane) in a thin layer on the surface of the porous film with a cotton swab into which silicone oil is penetrated such that the film becomes translucent.

(Fuse Short-Circuit Test)

Figure 2:
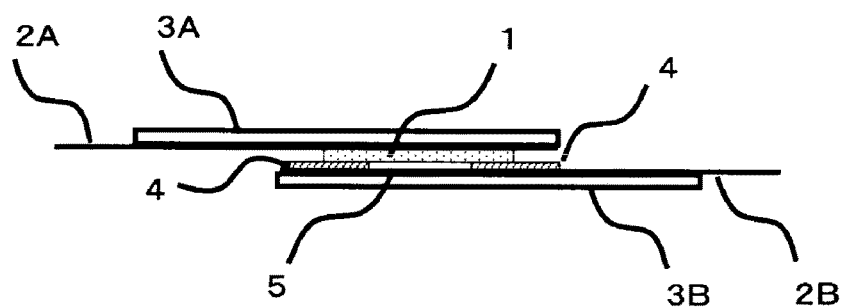
FIG. 2 is a cross-sectional diagram of the sample when used for the fuse short-circuit test.
Figure 3:
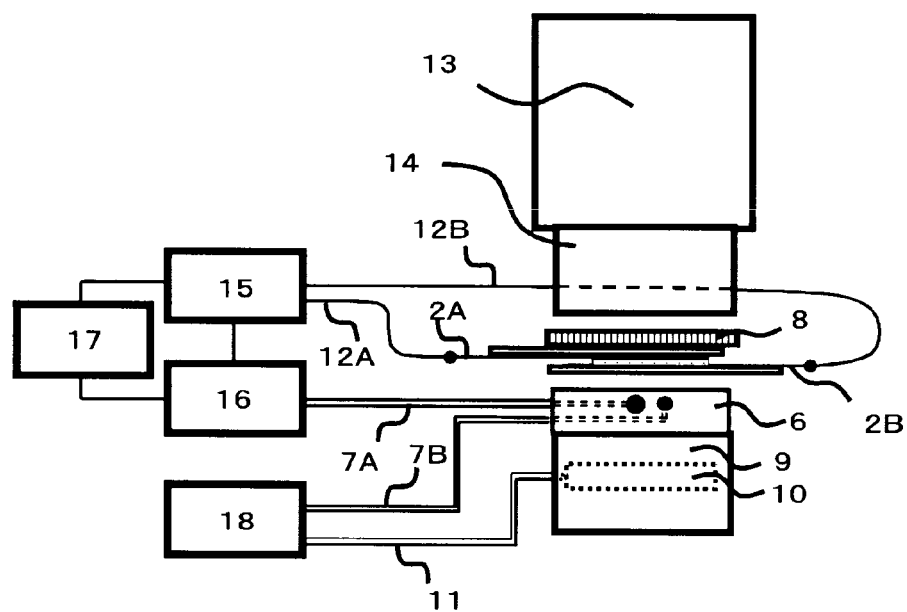
FIG. 3 is a schematic diagram showing a device configuration when performing the fuse short-circuit test.

Two nickel foils 2A, 2B each having a thickness of 10 μm were prepared, and a "Teflon"™ tape was attached to the nickel foil 2B in advance such that an opening 5 having a size of 10 mm×10 mm is formed, as shown in FIG. 1. A porous film 1 which was sufficiently impregnated with 1 mol/L of lithium borofluoride solution (solvent: propylene carbonate/ethylene carbonate/γ-butyl lactone=1/1/2) as an electrolyte was closely-attached to the other nickel foil 2A. The nickel foils 2A, 2B were overlapped with each other such that the porous film 1 covered the whole of the opening 5 provided in the nickel foil 2B as shown in FIG. 2, and then, the nickel foils 2A, 2B were sandwiched between commercially available glass plates 3A, 3B to produce a measurement sample. Meanwhile, a hot plate 9 having a diameter φ of 60 mm was arranged below a cylinder 14 of a hydraulic pressing machine 13, a wooden plate 6 having a thickness of 8 mm, in which thermocouples 7A, 7B are embedded, was arranged thereon, and then, the measurement sample shown in FIG. 2 and a silicone rubber plate 8 having a thickness of 6 mm were arranged in this order, and they were pressurized to 1 MPa by the hydraulic pressing machine 13. The nickel foils 2A, 2B were connected to an electric resistance measuring apparatus (LCR meter "AG-4311"™ manufactured by Ando Electric Co., Ltd.) with lead wires 12A, 12B, and furthermore, the thermocouple 7A was connected to a thermometer 16, and a temperature and electric resistance were measured under conditions at an alternating current of 1 V, 1 kHz. At this time, a wire 11 extended from a heater 10 and the thermocouple 7B were connected to a temperature controller 18, and the temperature was increased at a rate of 15° C./min from room temperature to 200° C.

In the temperature elevating process, a temperature when the electric resistance reached $10^3 \Omega$ one time (temperature measured with thermocouple 7A) was determined as a fuse temperature, and after that, a temperature when the electric resistance became lower than $10^3 \Omega$ again (temperature measured with thermocouple 7A) was determined as a short-circuit temperature.

(Average Molecular Weight, Molecular Weight Distribution)

The average molecular weights (Mw, Mn) and the molecular weight distribution (Mw/Mn) were measured by a gel permeation chromatography (GPC) using the following apparatuses under the following conditions.

GPC measuring apparatus: HLC-8121GPC/HT (manufactured by Tosoh Corporation)
column: TSKgelGMH$_{HR}$-H HT×2
apparatus temperature: all paths 155° C.
eluent: ortho-dichlorobenzene (0.05% BHT) 1 ml/min
amount of sample: 500 μl (0.5 mg/ml)

detector: R1
calibration curve: made by using polystyrene whose average molecular weight and molecular weight distribution are known (TD Stretching Unevenness)

The measurement was performed using a stylus-type continuous thickness measuring apparatus (manufactured by Yamabun Electronics Co., Ltd, TOF-5R01) under conditions of a measurement pitch of 1 mm and a five-point moving average. A thickness tolerance was obtained based on the results, and the TD stretching unevenness was evaluated in accordance with the following evaluation criteria.

thickness tolerance (%)=((maximum value of thickness)−(minimum value of thickness))/average thickness×100

◉: 20% or less
◯: 30% or less
Δ: 40% or less
x: more than 40%

(TD Dimensional Stability)

Gauge lines indicating one interval were marked in advance in an MD uniaxially-stretched film before the TD cold stretching in the TD direction, and a dimension between the gauge lines was measured immediately with respect to the porous film processed in the TD cold stretching step and the thermal fixing step. After that, the film was left for 24 hours at ambient temperature of 30° C. without preventing contraction in the TD direction, the dimension between the gauge lines was then measured again, and a dimension change ratio in the film width TD direction was obtained. The dimensional stability was evaluated in accordance with the following criteria.

◉: 2% or less
◯: 4% or less
Δ: 6% or less
x: more than 6%

(Film Width Retention Ratio)

Gauge lines indicating one interval were marked in advance in the non-porous raw fabric in the TD direction, and a dimension $W_0$ between the gauge lines was measured. Moreover, with respect to the porous film produced by using the non-porous raw fabric, a dimension W between the gauge lines was measured again, and the film width retention ratio was obtained in accordance with the following expression.

Film width retention ratio (%)=$W/W_0$×100

In the expression, $W_0$ represents a TD dimension between gauge lines (unit: m) of the non-porous raw fabric, and W represents a TD dimension between gauge lines (unit: m) of the obtained polyolefin-based porous film ($W_1$ in the case of uniaxially-stretched porous film, $W_3$ in the case of biaxially-stretched porous film).

1. Examples A

Polyolefin-Based Resin Used for Examples A1 to 8, and Comparative Example A1

The following polyethylenes were used as polyolefin-based resin compositions in Examples A1 to 8 and Comparative Example A1.

(PE-A1): polyethylene copolymer (comonomer: propylene), Suntec HD S160S (manufactured by Asahi Kasei Chemicals Corporation), density=0.960 g/cm$^3$, MI=0.8 g/10 min, weight-average molecular weight=140000, molecular weight distribution=5.3.

(PE-A2): polyethylene copolymer (comonomer: 1-butene), Nipolon Hard #6300 (manufactured by Tosoh Corporation), density=0.962 g/cm$^3$, MI=0.25 g/10 min, weight-average molecular weight=180000, molecular weight distribution=15.3.

(PE-A3): blending composition of PE-A1/PE-A2=50 mass %/50 mass %, density (calculated value)=0.961 g/cm$^3$, MI=0.43 g/10 min.

(PE-A4): polyethylene homopolymer, Suntec HD B161 (manufactured by Asahi Kasei Chemicals Corporation), density=0.963 g/cm$^3$, MI=1.3 g/10 min, weight-average molecular weight=150000, molecular weight distribution=8.4.

Example A1

The above-described polyethylene PE-A1 was melt kneaded by an uniaxial extruder (L/D=32), extruded from a T-die (coat hanger type), drawn off by a cast roll at a draft ratio of 400 times while cooling with an air knife to form a non-porous raw fabric having a thickness of 20 μm, and then, the non-porous raw fabric was wound around a 3 inch paper core ((A) step). The forming conditions are shown in Table A1. After that, the non-porous raw fabric wound around the paper core was left in a drier at a temperature of 120° C. for 3 hours, and the annealing treatment ((F) step) was performed.

Next, the non-porous raw fabric to which the annealing treatment was performed was MD cold stretched 1.5 times at room temperature (RT) ((B) step), and then, after performing the MD heat stretching 2.5 times at a temperature of 120° C. ((C) step), the MD thermal fixing ((G) step) was performed continuously at a temperature of 125° C., and a polyethylene (hereinafter, abbreviated as "PE") uniaxially-stretched porous film of Example A1 having a MD total stretching ratio of 3.75 times was wound around a 3 inch paper core. The uniaxially stretching conditions and various evaluation results are shown in Table A2.

Examples A2 to 4

A non-porous raw fabric having a thickness of 26 μm was obtained at a draft ratio of 300 times using the polyethylene copolymer PE-A2, and a PE uniaxially-stretched porous film of Example A2 was obtained in the same manner as Example A1.

In addition, Examples A3 and 4 were the same as Example A1, except that the roll speeds (stretching speeds) of the respective steps were increased compared to Example A2. These uniaxially stretching conditions and various evaluation results are shown in Table A2.

Example A5

PE-A3 (dry blend product) was melt kneaded by an uniaxial extruder equipped with a dulmadge type screw and was extruded from a T-die at a temperature of 160° C., and a non-porous raw fabric having a thickness of 28 μm was obtained at a draft ratio of 300 times. Annealing treatment conditions and MD stretching conditions were the same as in Example A3. The uniaxially stretching conditions and various evaluation results are shown in Table A2.

Comparative Example A1

The homopolymer polyethylene PE-A4 was extruded from a T-die at a temperature of 200° C., a non-porous raw fabric having a thickness of 18 μm was obtained at a draft ratio of 300 times, and a PE uniaxially-stretched porous film of Comparative Example A1 was obtained in the same manner as Example A1. The uniaxially stretching conditions and various evaluation results are shown in Table A2.

As shown in Table A2, in Comparative Example A1, the pore surface area was more than 42 m²/g and the birefringence was less than $2.0 \times 10^{-2}$.

Stretching Conditions and Various Physical Properties of Biaxially-Stretched Porous Film Example A6

The uniaxially-stretched porous film obtained in Example A5 was stretched 1.14 times in the TD at a temperature of 60° C. and the thermal fixation was performed at a temperature of 125° C. while relaxing the film by 0.9% in the TD by a tenter stretching machine (manufactured by Ichikin Co., Ltd.), and thus, a PE biaxially-stretched porous film having a TD total stretching ratio of 1.13 times was obtained. The TD stretching conditions and various evaluation results are shown in Table A3.

[Producing Conditions and Various Physical Properties of Heat Resistant Multilayered Porous Film]

(Synthesis of Acrylate-Based Latex)

An acrylate copolymer latex 1 having an average particle size of 90 nm, which contains a (meth)acrylic acid ester monomer, an unsaturated carboxylic acid monomer, and a crosslinkable monomer as raw material units was prepared in the same manner as Synthesis Example 1 disclosed in Japanese Patent Laid-Open No. 2011-832.

(Preparation of Coating Liquid)

Next, 88.4 parts by mass of wet kaolin containing fired kaolin 1 (kaolinite ($Al_2Si_2O_5(OH)_4$)) as a major component, to which high-temperature firing treatment was performed, and having an average particle size of 1.89 μm as inorganic particles and 11.6 parts by mass of the latex 1 as a resin binder were dispersed into 150 parts by mass of water to prepare a coating liquid 1.

Examples A7, 8

The corona discharge treatment and the hydrophilic treatment ((I) step) were performed to surfaces of the PE vertical uniaxially-stretched porous film and the PE biaxially-stretched porous film used in Example A5 and Example A6. The coating liquid 1 was applied to these PE porous films using a microgravure coater and dried at a temperature of 60° C. to obtain Example A7 and Example A8 as heat resistant porous films in each of which a heat resistant porous layer (binder ratio in heat resistant porous layer 5.0%) having a thickness of 7 μm on the surface of the PE porous film. These evaluation results of various physical properties are shown in Table 4.

TABLE A1

| | Item | Unit | PE-A1 | PE-A2 | PE-A3 | PE-A4 |
|---|---|---|---|---|---|---|
| Polymer physical property | Density | g/cm³ | 0.960 | 0.962 | 0.961 | 0.963 |
| | MI | g/10 min | 0.8 | 0.25 | 0.43 | 1.3 |
| | Comonomer kind | — | Propylene | 1-butene | Propylene 1-butene | — |
| Non-porous raw fabric forming condition | Extrusion temperature | ° C. | 190 | 220 | 160 | 200 |
| | Die temperature | ° C. | 190 | 220 | 160 | 200 |
| | Extrusion amount | kg/hr | 4 | 4 | 10.1 | 4 |
| | Die lip clearance | mm | 7.5 | 7.5 | 9 | 7 |
| | Cast roll Draw-off speed | m/min | 9.27 | 6.95 | 10.6 | 7.41 |
| | Temperature | ° C. | 115 | 115 | 110 | 115 |
| | Draft ratio | Times | 400 | 300 | 300 | 300 |
| Non-porous raw fabric | Annealing | | 120° C.-3 hr | | | |
| | Melting point (Tm) | ° C. | 133 | 132 | 133 | 132 |
| | Thickness | μm | 20 | 26 | 28 | 18 |

TABLE A2

| | Item | | Unit | Example A1 | Example A2 | Example A3 | Example A4 | Example A5 | Comparative Example A1 |
|---|---|---|---|---|---|---|---|---|---|
| Material | PE kind | | — | PE-A1 | | PE-A2 | | PE-A3 | PE-A4 |
| MD stretching condition | Cold stretching[Note 1)] | Stretching ratio | Times | 1.5 | | 1.5 | | 1.5 | 1.5 |
| | | Temperature | ° C. | RT | | RT | | RT | RT |
| | Heat stretching[Note 1)] | Stretching ratio | Times | 2.5 | | 2.5 | | 2.5 | 2.5 |
| | | Temperature | ° C. | 120 | | 120 | | 120 | 120 |
| | Thermal fixing | Relaxation ratio | % | 0 | | 0 | | 0 | 0 |
| | | Temperature | Times | 125 | | 125 | | 125 | 125 |
| | | Time | sec | 17 | 17 | 11 | 7 | 11 | 17 |
| | | Speed (feed/wind)[Note 2)] | m/min | 2.0/7.5 | 2.0/7.5 | 3.0/11.25 | 5.0/18.75 | 3.0/11.25 | 2.0/7.5 |
| Porous film physical property value | Air permeability[Note 3)] | | sec/100 cc | 594 | 249 | 332 | 465 | 219 | 65 |
| | Porosity | | % | 47.3 | 56.7 | 55.3 | 54 | 57 | 65.2 |
| | Electric resistance[Note 3)] | | Ω·cm² | 0.8 | 0.32 | 0.46 | 0.78 | 0.6 | 0.3 |
| | Withstand voltage[Note 3)] | | kV | 2.2 | 1.81 | 1.92 | 2.22 | 1.6 | 0.6 |
| | Puncture strength[Note 3)] | | N | 4.3 | 2.7 | 2.9 | 3.1 | 2.7 | 1.7 |
| | Maximum pore size (mode diameter) | | μm | 0.24 | 0.3 | 0.27 | 0.24 | 0.2 | 0.31 |
| | Pore surface area | | m²/g | 36.2 | 39 | 37.8 | 36.9 | 41.0 | 42.4 |
| | Birefringence | | — | 0.0276 | 0.0223 | 0.0231 | 0.0263 | 0.0232 | 0.0176 |
| | Thickness | | μm | 12 | 17 | 17 | 17 | 23 | 17 |

TABLE A2-continued

| | Item | Unit | Example A1 | Example A2 | Example A3 | Example A4 | Example A5 | Comparative Example A1 |
|---|---|---|---|---|---|---|---|---|
| Evaluation | Electric resistance | — | ○ | ◎ | ◎ | ○ | ○ | ◎ |
| | Withstand voltage | — | ◎ | ◎ | ◎ | ◎ | ◎ | Δ |
| | Puncture strength | — | ◎ | ◎ | ◎ | ◎ | ◎ | Δ |

Note 1)stretching ratio: a cold stretching ratio is a value obtained based on a roll speed before cold stretching, and a heat stretching ratio is a value obtained based on a roll speed after cold stretching.
Note 2)feed represents a roll speed before MD cold stretching, and wind represents a roll speed after MD thermal fixing.
Note 3)value converted for 20 μm in thickness.

TABLE A3

| | Item | | Unit | Example A6 |
|---|---|---|---|---|
| Polymer property | PE kind | | — | PE-A3 |
| Non-porous raw fabric | Density | | g/cm$^3$ | 0.961 |
| | Melting point (Tm) | | °C. | 133 |
| | Glass-transition temperature (Tg) | | °C. | −126 |
| TD stretching condition | TDCold stretching$^{Note\ 1)}$ | Ratio | Times | 1.14 |
| | | Temperature | °C. | 60 |
| | TDThermal fixing | Relaxation ratio | % | 0.9 |
| | | Temperature | °C. | 125 |
| | TD total stretching ratio | | Times | 1.13 |
| Physical property value | Air permeability$^{Note\ 2)}$ | | sec/100 cc | 142 |
| | Porosity | | % | 60.0 |
| | Electric resistance$^{Note\ 2)}$ | | Ω·cm$^2$ | 0.31 |
| | Withstand voltage$^{Note\ 2)}$ | | kV | 1.5 |
| | Puncture strength$^{Note\ 2)}$ | | N | 2.7 |
| | Maximum pore size (mode diameter) | | μm | 0.26 |
| | Pore surface area | | m$^2$/g | 41.1 |
| | Birefringence | | — | 0.0228 |
| | Thickness | | μm | 22 |
| Evaluation | Electric resistance | | — | ◎ |
| | Withstand voltage | | — | ○ |
| | Puncture strength | | — | ◎ |

Note 1)TD stretching ratio was obtained by marking gauge lines spaced 5 cm apart on a porous film before tenter stretching in a TD direction, and by measuring a dimension between the gauge lines after tenter stretching.
Note 2)value converted for 20 μm in thickness.

TABLE A4

| | Item | | Unit | Example A7 | Example A8 |
|---|---|---|---|---|---|
| | PE kind | | — | PE-A3 | |
| Physical property value | Thickness | Base material layer | | 23 | 23 |
| | | Heat resistant porous layer | | 7 | 7 |
| | Air permeability$^{Note\ 1)}$ | | sec/100 cc | 220 | 183 |
| | Electric resistance$^{Note\ 1)}$ | | Ω·cm$^2$ | 0.65 | 0.33 |
| | Withstand voltage$^{Note\ 1)}$ | | kV | 1.6 | 1.32 |
| | Fuse temperature | | °C. | 146 | 146 |
| | Short-circuit temperature | | | >200 | >200 |
| Evaluation | Electric resistance | | — | ○ | ◎ |
| | Withstand voltage | | — | ◎ | ◎ |
| | Heat resistance | | — | ◎ | ◎ |

Note 1)value converted for 20 μm in thickness of a base material layer.

As shown in Table 2A and Table 3A, a balance among electric resistance, a withstand voltage, and puncture strength was good when the pore surface area of the porous film was within the range of 35.0 to 42.0 m$^2$/g and the birefringence was within the range of $2.0 \times 10^{-2}$ to $4 \times 10^{-2}$ as Examples A1 to 5.

Moreover, according to the results of Table 4A, in the heat resistant porous film having a heat resistant porous layer made of inorganic fillers, a fuse state was maintained at high temperature of 200° C. or more after pores were closed (fused) at a temperature of 146° C. in the fuse short-circuit test, and heat resistance was excellent.

2. Examples B

The following polyethylenes were used as polyolefin resin compositions in Examples B1 to 6 and Comparative Examples B1 to 3.
(PE-B1): Suntec HD S160S (manufactured by Asahi Kasei Chemicals Corporation), density=0.960 g/cm$^3$, MI=0.8 g/10 min.
(PE-B2): Nipolon Hard #5110 (manufactured by Tosoh Corporation), density=0.961 g/cm$^3$, MI=0.9 g/10 min.
(PE-B3): Nipolon Hard #6300 (manufactured by Tosoh Corporation), density=0.962 g/cm$^3$, MI=0.25 g/10 min.
(PE-B4): blending composition of PE-1/PE-3=50 mass %/50 mass %, density (calculated value)=0.961 g/cm$^3$, MI=0.43 g/10 min.
(PE-B5): Suntec HD B161 (manufactured by Asahi Kasei Chemicals Corporation), density=0.963 g/cm$^2$, MI=1.3 g/10 min.
(PE-B6): Suntec HD 5362 (manufactured by Asahi Kasei Chemicals Corporation), density=0.952 g/cm$^2$, MI=0.8 g/10 min.

Examples B1 to 3

Each of the above-described polyethylenes PE-B1 to 3 was melt kneaded by an uniaxial extruder, extruded from a T-die (coat hanger type), drawn off by a cast roll while cooling with an air knife to form a non-porous raw fabric, and then, the non-porous raw fabric was wound around a 3 inch paper core ((A) step). At this time, birefringence of the non-porous raw fabric was set to be $3.0 \times 10^{-2}$ or more by making a draft ratio be 300 times or more.

After that, the each non-porous raw fabric wound around the paper core was left in a drier at a temperature of 120° C. for 3 hours, and the annealing treatment ((F) step) was performed.

Next, the non-porous raw fabric to which the annealing treatment was performed was MD cold stretched 1.5 times at room temperature (RT) ((B) step), and then, after performing the heat stretching 2.5 times in the MD at a temperature of 120° C. ((C) step), the thermal fixing was performed continuously at a temperature of 125° C., and a polyethylene (hereinafter, abbreviated as "PE") uniaxially-stretched porous film having an MD total stretching ratio of 3.75 times was obtained. Various conditions until the porous film was obtained and various evaluation results of the obtained PE uniaxially-stretched porous film are shown in Table B1.

Example B4

A PE uniaxially-stretched porous film was obtained under the same conditions as Example B3, except that the MD stretching speed (both cold stretching and heat stretching) was increased and time of the thermal fixing was changed. The uniaxially stretching conditions and various evaluation results are shown in Table B1.

Example B5

PE-B4 as a polyolefin resin was melt kneaded by an uniaxial extruder (dulmadge type screw), extruded from a T-die, drawn off by a cast roll while cooling with an air knife to form a non-porous raw fabric, and then, the non-porous raw fabric was wound around a 3 inch paper core ((A) step). At this time, a draft ratio was 300 times and birefringence of the non-porous raw fabric was $3.5 \times 10^{-2}$. Annealing conditions and vertical uniaxially stretching conditions were the same as those in Example B1. Various conditions until the porous film was obtained and various evaluation results of the obtained PE uniaxially-stretched porous film are shown in Table B1.

Comparative Example B1

By using PE-B5 as a polyolefin resin composition, a non-porous raw fabric having a draft ratio of 188 times was obtained, and a PE uniaxially-stretched porous film was obtained under the MD stretching conditions same as in Example B1. Birefringence of the non-porous raw fabric before annealing treatment, which was obtained by the forming, was less than $3.0 \times 10^{-2}$ ($2.0 \times 10^{-2}$). Various conditions until the porous film was obtained and various evaluation results of the obtained PE uniaxially-stretched porous film are shown in Table B1.

Comparative Example B2

By using PE-B5 as a polyolefin resin composition, a non-porous raw fabric having a draft ratio of 300 times was obtained, and a PE uniaxially-stretched porous film was obtained under the MD stretching conditions same as in Example B1. Birefringence of the non-porous raw fabric before annealing treatment, which was obtained by the forming, was $3.0 \times 10^{-2}$ or more ($3.1 \times 10^{-2}$). However, a pore surface area was more than 42.0 m²/g. Various conditions until the porous film was obtained and various evaluation results of the obtained PE uniaxially-stretched porous film are shown in Table B1.

Comparative Example B3

By using PE-B6 having a density of 0.952 g/cm³ as a polyolefin resin composition, a PE uniaxially-stretched porous film was obtained under the conditions same as in Example B1, except that forming conditions were set to be as shown in Table B1. Birefringence of the non-porous raw fabric before annealing treatment, which was obtained by the forming, was less than $3.0 \times 10^{-2}$ ($2.9 \times 10^{-2}$). Various conditions until the porous film was obtained and various evaluation results of the obtained PE uniaxially-stretched porous film are shown in Table B1. It is to be noted that, in Comparative Example B3, pore opening was insufficient because the density was lower than 0.958. Therefore, physical properties other than air permeability were decided to be unworthy of being evaluated, and the evaluation was abandoned.

Stretching Conditions and Various Physical Properties of Biaxially-Stretched Porous Film Example B6

The uniaxially-stretched porous film obtained under the conditions of Example B5 was stretched 1.14 times in the TD at a temperature of 60° C. and the thermal fixation was performed by an off-line tenter stretching machine (manufactured by Ichikin Co., Ltd.) to obtain a PE biaxially-stretched porous film. The TD stretching conditions and various evaluation results are shown in Table B2.

TABLE B1

| | Item | Unit | Example B1 | Example B2 | Example B3 | Example B4 | Example B5 | Comparative Example B1 | Comparative Example B2 | Comparative Example B3 |
|---|---|---|---|---|---|---|---|---|---|---|
| Material | Kind | — | PE-B1 | PE-B2 | PE-B3 | PE-B4 | PE-B5 | PE-B5 | PE-B5 | PE-B6 |
| | Density | g/cm³ | 0.960 | 0.961 | 0.962 | 0.961 | 0.963 | | | 0.952 |
| | MI | g/10 min | 0.8 | 0.9 | 0.25 | 0.43 | 1.3 | | | 0.8 |
| | Die temperature | °C. | 190 | 190 | 220 | 160 | 200 | 200 | 200 | 200 |
| | Die lip clearance | mm | 7.5 | 7.5 | 7.5 | 9 | 6 | 7 | 5 | |
| Draft ratio | Times | | 400 | 300 | 300 | 300 | 188 | 300 | 300 | |
| Non-porous raw fabric | Thickness | μm | 20 | 26 | 26 | 28 | 36 | 20 | 19 | |
| | Melting point (Tm) | °C. | 133 | 132 | 132 | 133 | 132 | 132 | 131 | |
| | Birefringence[Note 1] | — | 0.033 | 0.031 | 0.033 | 0.035 | 0.020 | 0.031 | 0.029 | |
| Annealing | Treatment temperature | °C. | 120 | 120 | 120 | 120 | 120 | 120 | 120 | |
| MD stretching condition | Cold stretching[Note 2] Stretching ratio | Times | 1.5 | 1.5 | 1.5 | 1.5 | 1.5 | 1.5 | 1.5 | |
| | Temperature | °C. | RT | RT | RT | RT | RT | RT | RT | |
| | Heat stretching[Note 2] Stretching ratio | Times | 2.5 | 2.5 | 2.5 | 2.5 | 2.5 | 2.5 | 2.5 | |
| | Temperature | °C. | 120 | 120 | 120 | 120 | 120 | 120 | 120 | |
| | Thermal fixing Relaxation ratio | % | 0 | 0 | 0 | 0 | 0 | 0 | 0 | |
| | Temperature | Times | 125 | 125 | 125 | 125 | 125 | 125 | 125 | |
| | Time | sec | 17 | 17 | 17 | 7 | 11 | 17 | 17 | 17 |
| | Speed (feed/wind)[Note 5] | m/min | 2.0/7.5 | 2.0/7.5 | 2.0/7.5 | 5.0/18.75 | 3.0/11.25 | 2.0/7.5 | 2.0/7.5 | 2.0/7.5 |
| Physical property value | Air permeability[Note 3] | sec/100 cc | 594 | 321 | 249 | 465 | 219 | 273 | 65 | 41.467 |
| | Porosity | % | 47.3 | 54.8 | 56.7 | 54 | 57 | 52 | 65.2 | Note 4) |
| | Electric resistance[Note 3] | Ω·cm² | 0.8 | 0.73 | 0.3 | 0.78 | 0.6 | 0.8 | 0.3 | |

TABLE B1-continued

| Item | | Unit | Example B1 | Example B2 | Example B3 | Example B4 | Example B5 | Comparative Example B1 | Comparative Example B2 | Comparative Example B3 |
|---|---|---|---|---|---|---|---|---|---|---|
| | Withstand voltage[Note 3] | kV | 2.2 | 1.9 | 1.8 | 2.2 | 1.6 | 0.96 | 0.6 | |
| | Puncture strength[Note 3] | N | 4.3 | 3.2 | 2.7 | 3.1 | 2.7 | 1.9 | 1.7 | |
| | Maximum pore size (mode diameter) | μm | 0.24 | 0.26 | 0.3 | 0.24 | 0.2 | 0.3 | 0.31 | |
| | Pore surface area | m²/g | 36.2 | 37.9 | 39 | 36.9 | 41 | 37.2 | 42.4 | |
| | Thickness | μm | 12 | 18 | 17 | 17 | 23 | 28 | 17 | 9 |
| Evaluation | Electric resistance | — | ○ | ○ | ◎ | ○ | ○ | ○ | ◎ | X (Estimate) |
| | Withstand voltage | — | ◎ | ◎ | ◎ | ◎ | ◎ | Δ | Δ | — |
| | Puncture strength | — | ◎ | ◎ | ◎ | ◎ | ◎ | Δ | Δ | — |

Note 1) measurement value before annealing treatment.
Note 2) stretching ratio: a cold stretching ratio is a value obtained based on a roll speed before cold stretching, and a heat stretching ratio is a value obtained based on a roll speed after cold stretching.
Note 3) value converted for 20 μm in thickness.
Note 4) unmeasured because of significantly low air permeability and evaluation of not having adequacy of a separator.
Note 5) feed represents a roll speed before MD cold stretching, and wind represents a roll speed after MD thermal fixing.

TABLE B2

| Item | | Unit | Example B6 |
|---|---|---|---|
| Polymer property | Kind | — | PE-B4 |
| | Density | — | 0.961 |
| | Melting point (Tm) of non-porous raw fabric | °C. | 132 |
| | Glass-transition temperature (Tg) of vertical uniaxially-stretched film | °C. | −126 |
| | Birefringence of non-porous raw fabric[Note 1] | — | 0.035 |
| TD stretching condition | TD cold stretching Ratio | Times | 1.14 |
| | Temperature | °C. | 60 |
| | Thermal fixing Relaxation ratio | % | 0.9 |
| | Temperature | °C. | 80 |
| | Time | sec | 12 |
| | TD total stretching ratio | Times | 1.13 |
| | Film width retention ratio | % | 98 |
| Physical property value | Air permeability[Note 2] | sec/100 cc | 142 |
| | Porosity | % | 60.0 |
| | Electric resistance[Note 2] | Ω·cm² | 0.31 |
| | Withstand voltage[Note 2] | kV | 1.5 |
| | Puncture strength[Note 2] | N | 2.7 |
| | Maximum pore size (mode diameter) | μm | 0.26 |
| | Pore surface area | m²/g | 41.1 |
| | Thickness | μm | 22 |
| Evaluation | Electric resistance | — | ◎ |
| | Withstand voltage | — | ○ |
| | Puncture strength | — | ◎ |

Note 1) measurement value without annealing treatment.
Note 2) value converted for 20 μm in thickness.

As shown in Table B1 and Table B2, the polyolefin porous films of Examples excelled in a balance among electric resistance, a withstand voltage, and puncture strength, compared to the porous film whose non-porous raw fabric has birefringence of less than $3.0 \times 10^{-2}$ (Comparative Examples B1, B3) or the porous film having a pore surface area of more than 42.0 m²/g (Comparative Example B2). Furthermore, air permeability was significantly low in Comparative Example B3 using a polyolefin resin having a density smaller than 0.960 (0.952 g/cm³), and Comparative Example B3 was unworthy of being evaluated.

3. Examples C

Polyethylene-Based Vertical Uniaxially-Stretched Porous Film PE-C1

As a polyolefin-based resin, a homopolymer polyethylene having MI=0.2 g/10 min, density=0.963 g/cm³, and weight-average molecular weight (Mw)=210000 and molecular weight distribution (Mw/Mn)=16 measured by GPC was used. The resin was melted by an uniaxial extruder at a preset temperature of 210° C. and extruded from a T-die (lip clearance=9 mm) at a temperature of 210° C. The molten resin was drawn off by a cast roll whose temperature was set to be 110° C. while being cooled with an air knife. A draft ratio at this time was 300 times and a non-porous raw fabric having a thickness of 27 μm was obtained.

Next, with respect to the non-porous raw fabric, heating treatment for 3 minutes was continuously performed in an annealing oven at a temperature of 120° C., and then, 1.5 times of cold stretching in the MD (room temperature) was performed at one step and 2.5 times of heat stretching in the MD (120° C.) was performed at three steps (equally stretching speed (%/min)). After that, only the thermal fixing in the MD was further performed at a temperature of 125° C., and a polyethylene-based vertical uniaxially-stretched porous film PE-C1 having a thickness of 24 μm was obtained. It is to be noted that producing conditions of the non-porous raw fabric and the vertical uniaxially-stretched porous film, and various property values thereof were as shown in Table C1.

(Polypropylene-Based Vertical Uniaxially-Stretched Porous Film PP-C1)

As a polyolefin-based resin, an isotactic homopolypropylene, a product name of "Prime Polypro E111G", (MI=0.5 g/10 min, density=0.910 g/cm³, manufactured by Prime Polymer Co., Ltd.) was used. The polypropylene-based resin was melted by an uniaxial extruder at a preset temperature of 260° C. and extruded from a T-die (lip clearance=2.5 mm) at a temperature of 240° C. The molten resin was drawn off by a cast roll whose temperature was set to be 130° C. while being cooled with an air knife. A draft ratio at this time was 100 times and a non-porous raw fabric having a thickness of 28 μm was obtained.

Next, with respect to the non-porous raw fabric, heating treatment for 15 minutes was continuously performed in an annealing oven at a temperature of 140° C., and then, 1.1 times of cold stretching in the MD (room temperature) was performed at one step and 2.7 times of heat stretching in the MD (130° C.) was performed at three steps (equally stretching speed (%/min)). After that, the thermal fixing in the MD was further performed, and a polypropylene-based vertical uniaxially-stretched porous film PP-C1 having a thickness of 24 μm was obtained. It is to be noted that producing conditions of the non-porous raw fabric and the vertical uniaxially-stretched porous film, and various property values thereof were as shown in Table C1.

Example C1

The PE uniaxially-stretched porous film PE-C1 was TD cold stretched 1.1 times at a temperature of 25° C., and then, the thermal fixation was performed at a temperature of 125° C. in the thermal fixing step with both ends of the film held by a tenter clip, using a tenter stretching machine (manufactured by Ichikin Co., Ltd.) to obtain a polyethylene (hereinafter, abbreviated as PE)-based biaxially-stretched porous film. All of wind speeds of the respective steps at this time were set to be 9.3 m/sec. Conditions of the TD cold stretching and the thermal fixation, and various evaluation results are shown in Table C2.

Example C2

A PE-based biaxially-stretched porous film was obtained under the same conditions as Example C1, except that the TD cold stretching temperature was 70° C. Conditions of the TD cold stretching and the thermal fixation, and various evaluation results are shown in Table C2.

Example C3

A PE-based biaxially-stretched porous film was obtained under the same conditions as Example C1, except that the TD cold stretching ratio was 1.2 times. Conditions of the TD cold stretching and the thermal fixation, and various evaluation results are shown in Table C2.

Example C4

A PE-based biaxially-stretched porous film was obtained under the same conditions as Example C3, except that the TD cold stretching temperature was 70° C. Conditions of the TD cold stretching and the thermal fixation, and various evaluation results are shown in Table C2.

Example C5

A PE-based biaxially-stretched porous film was obtained under the same conditions as Example C3, except that the TD cold stretching temperature was 100° C. Conditions of the TD cold stretching and the thermal fixation, and various evaluation results are shown in Table C2.

Example C6

A PE-based biaxially-stretched porous film was obtained under the same conditions as Example C3, except that the thermal fixing temperature was 120° C. Conditions of the TD cold stretching and the thermal fixation, and various evaluation results are shown in Table C2.

Example C7

A PE-based biaxially-stretched porous film was obtained under the same conditions as Example C4, except that the thermal fixing temperature was 120° C. Conditions of the TD cold stretching and the thermal fixation, and various evaluation results are shown in Table C2.

Example C8

A PE-based biaxially-stretched porous film was obtained under the same conditions as Example C5, except that the thermal fixing temperature was 120° C. Conditions of the TD cold stretching and the thermal fixation, and various evaluation results are shown in Table C2.

Example C9

A PE-based biaxially-stretched porous film was obtained under the same conditions as Example C4, except that the thermal fixing temperature was 110° C. Conditions of the TD cold stretching and the thermal fixation, and various evaluation results are shown in Table C2.

Comparative Example C1

PE-C1 was used as a film of Comparative Example C1. Various evaluation results are shown in Table C2.

Comparative Example C2

The PE-based vertical uniaxially-stretched porous film PE-C1 was TD cold stretched 1.2 times at a temperature of 70° C. in the TD cold stretching step, and then, the thermal fixation was performed in the thermal fixing step at a temperature of 70° C. which is the same as the TD cold stretching temperature to obtain a PE biaxially-stretched porous film. Conditions of the TD cold stretching and the thermal fixation, and various evaluation results are shown in Table C2.

Comparative Example C3

A PE-based biaxially-stretched porous film was obtained under the same conditions as Comparative Example C2, except that the thermal fixing temperature was 90° C. Conditions of the TD cold stretching and the thermal fixation, and various evaluation results are shown in Table C2.

Comparative Example C4

A PE-based biaxially-stretched porous film was obtained under the same conditions as Comparative Example C2, except that the thermal fixing temperature was 130° C. Conditions of the TD cold stretching and the thermal fixation, and various evaluation results are shown in Table C2. Since film fracture was generated in the TD cold stretching under the conditions, a film which is worthy of being evaluated was not obtained.

Comparative Example C5

A PE-based biaxially-stretched porous film was obtained under the same conditions as Comparative Example C2, except that the TD cold stretching temperature and the thermal fixation temperature was 110° C. Conditions of the TD cold stretching and the TD thermal fixation, and various evaluation results are shown in Table C2. Since film fracture was generated in the TD cold stretching under the conditions, a film which is worthy of being evaluated was not obtained.

Example C10

The PP uniaxially-stretched porous film PP-C1 was TD cold stretched 1.2 times at a temperature of 28° C., and then, the thermal fixation was performed at a temperature of 140° C. in the thermal fixing step with both ends of the film held by a tenter clip, using a tenter stretching machine (manufactured by Ichikin Co., Ltd.) to obtain a polypropylene (hereinafter, abbreviated as PP)-based biaxially-stretched porous film. All of wind speeds of the respective steps at this time were set to be 13.7 m/sec. Conditions of the TD cold stretching and the thermal fixation, and various evaluation results are shown in Table C3.

Example C11

A PP-based biaxially-stretched porous film was obtained under the same conditions as Example C10, except that the TD cold stretching temperature was 70° C. and the wind speed was 18.2 m/sec. Conditions of the TD cold stretching and the thermal fixation, and various evaluation results are shown in Table C3.

Example C12

A PP-based biaxially-stretched porous film was obtained under the same conditions as Example C10, except that the TD cold stretching temperature was 100° C. and the wind speed was 18.2 m/sec. Conditions of the TD cold stretching and the thermal fixation, and various evaluation results are shown in Table C3.

Example C13

A PP-based biaxially-stretched porous film was obtained under the same conditions as Example C10, except that the thermal fixing temperature was 130° C. Conditions of the TD cold stretching and the thermal fixation, and various evaluation results are shown in Table C3.

Example C14

A PP-based biaxially-stretched porous film was obtained under the same conditions as Example C11, except that the thermal fixing temperature was 130° C. Conditions of the TD cold stretching and the thermal fixation, and various evaluation results are shown in Table C3.

Example C15

A PP-based biaxially-stretched porous film was obtained under the same conditions as Example C12, except that the thermal fixing temperature was 130° C. Conditions of the TD cold stretching and the thermal fixation, and various evaluation results are shown in Table C3.

Example C16

A PP-based biaxially-stretched porous film was obtained under the same conditions as Comparative Example C11, except that the TD cold stretching temperature was 126° C. and the thermal fixation temperature was 146° C. Conditions of the TD cold stretching and the thermal fixation, and various evaluation results are shown in Table C3.

Comparative Example C6

PP-C1 was used as a film of Comparative Example C6. Various evaluation results are shown in Table C3.

Comparative Example C7

The PP-C1 was TD cold stretched 1.2 times at a temperature of 140° C., and then, the thermal fixation was performed in the thermal fixing step at a temperature of 140° C. which is the same as the TD cold stretching temperature to obtain a PP-based biaxially-stretched porous film. All of wind speeds of the respective steps at this time were set to be 18.2 m/sec. Conditions of the TD cold stretching and the thermal fixation, and various evaluation results are shown in Table C3.

(Producing Method of Three-Layered Laminate Vertical Uniaxially-Stretched Porous Film)

The isotactic homopolypropylene, a product name of "Prime Polypro E111G" used for the PP-C1, was melted by an uniaxial extruder at a preset temperature of 260° C. and extruded from a T-die (lip clearance=1 mm) at a temperature of 260° C. The molten resin was drawn off by a cast roll whose temperature was set to be 130° C. while being cooled with an air knife. A draft ratio at this time was 90 times and a non-porous raw fabric PP-C2 was obtained.

Moreover, the homopolymer polyethylene, a product name of "Suntec HD B161" (MI=1.3 g/10 min, density=0.963 g/cm$^3$, manufactured by Asahi Kasei Chemicals Corporation) was melted by an uniaxial extruder at a preset temperature of 180° C. and extruded from a T-die (lip clearance=2.5 mm) at a temperature of 180° C. The molten resin was drawn off by a cast roll whose temperature was set to be 100° C. while being cooled with an air knife. A draft ratio at this time was 350 times. Producing conditions and various property values of the above-described non-porous raw fabric PP-C2 and PE-C2 are shown in Table C4.

Next, the resins were put on a triaxial feeding section such that the PE-C2 was located at an inner layer and the PP-C2 was located at both outer layers, fed at a feeding speed of 8 m/min, thermo-compression bonded at a pressure of 2.7 kg/cm between heating rolls at a temperature of 132° C., and a non-porous raw fabric having a three-layered laminate structure was wound.

After that, with respect to the three-layered laminate raw fabric, annealing treatment for 30 minutes was continuously performed at a temperature of 130° C., and then, stretching was performed 1.3 times (room temperature) in the MD cold stretching step and 2.5 times (120° C.) in the MD heat stretching step, 10% of the MD thermal fixing relaxation was performed in the MD thermal fixing step at a temperature of 130° C., and the laminate uniaxially-stretched porous film (PP-C2/PE-C2/PP-C2) was wound. Vertical uniaxially stretching conditions and property values of the laminate uniaxially-stretched porous film were as shown in Table C5.

Example C17

The laminate vertical uniaxially-stretched porous film composed of the three layers (PP-C2/PE-C2/PP-C2) was TD cold stretched 1.2 times at a temperature of 100° C., and then, the thermal fixation was performed in the thermal fixing step at a temperature of 130° C. to obtain a laminate biaxially-stretched porous film of Example C17. Stretching conditions of the biaxially-stretched porous film, and various evaluation results are shown in Table C6.

Comparative Example C8

The laminate vertical uniaxially-stretched porous film was used in Comparative Example C8. Various evaluation results thereof are shown in Table C6.

Comparative Example C9

The laminate vertical uniaxially-stretched porous film was TD stretched 1.2 times at a temperature of 100° C., and then, the thermal fixation was performed in the thermal fixing step at a temperature of 100° C. which is the same as the TD cold stretching temperature to obtain a laminate biaxially-stretched porous film. Conditions of the biaxially-stretched porous film, and various evaluation results are shown in Table C6.

Comparative Example C10

A laminate biaxially-stretched porous film was obtained under the same conditions as Comparative Example C9, except that the TD cold stretching temperature and the thermal fixation temperature were 126° C. Conditions of the biaxially-stretched porous film, and various evaluation results are shown in Table C6.

Example C18

The corona discharge treatment was performed to the PE biaxially-stretched porous film obtained under the conditions of Example C4, and the coating liquid 1 prepared in Examples A was applied using a microgravure coater, and then, dried at a temperature of 60° C. to obtain a heat resistant porous film (Example C18) including a heat resistant porous layer (binder ratio in heat resistant porous layer 5.0%) having a thickness of 7 μm. In the multilayered porous film, a reduction in air permeability was minimal compared to before coating (Example C4), as shown in Table C7.

TABLE C1

| Item | | Unit | PE-C1 | PP-C1 |
|---|---|---|---|---|
| Non-porous raw fabric | Extrusion temperature | ° C. | 210 | 260 |
| | Die temperature | ° C. | 210 | 240 |
| | Die lip clearance | mm | 9 | 2.5 |
| | Melting point (Tm) | ° C. | 132 | 166 |
| | Draft ratio | Times | 300 | 100 |
| | Thickness | μm | 27 | 28 |
| | Annealing | | 120° C.-3 min (continuous) | 140° C.-15 min (continuous) |
| MD cold stretching | Ratio | Times | 1.5 | 1.1 |
| | Temperature | ° C. | RT | RT |
| MD heat stretching | Ratio | Times | 2.5 | 2.7 |
| | Temperature | ° C. | 120 | 130 |
| MD Thermal fixing | Temperature | ° C. | 125 | 145 |
| | Relaxation ratio | % | 0 | 10 |
| MD total stretching ratio | | Times | 2.75 | 2.67 |
| Vertical uniaxially-stretched film physical property | Thickness | μm | 24 | 24 |
| | Film width retention ratio | % | 87 | 88 |
| | Glass-transition temperature (Tg) | ° C. | −126 | −2 |

TABLE C2

| | Item | Unit | Example C1 | Example C2 | Example C3 | Example C4 | Example C5 | Example C6 | Example C7 |
|---|---|---|---|---|---|---|---|---|---|
| | | | | | | PE-C1 | | | |
| TD stretching | Ratio | Times | 1.1 | 1.1 | 1.2 | 1.2 | 1.2 | 1.2 | 1.2 |
| | Temperature | ° C. | 25 | 70 | 25 | 70 | 100 | 25 | 70 |
| | Wind speed | m/sec | 9.3 | 9.3 | 9.3 | 9.3 | 9.3 | 9.3 | 9.3 |
| Thermal fixing | Temperature | ° C. | 125 | 125 | 125 | 125 | 125 | 120 | 120 |
| | Relaxation ratio | % | 0 | 0 | 0 | 0 | 0 | 0 | 0 |
| | Wind speed | m/sec | 9.3 | 9.3 | 9.3 | 9.3 | 9.3 | 9.3 | 9.3 |
| TD total stretching ratio | | Times | 1.1 | 1.1 | 1.2 | 1.2 | 1.2 | 1.2 | 1.2 |
| Biaxially-stretched film physical property value | Film width retention ratio | % | 95.7 | 95.7 | 104.4 | 104.4 | 104.4 | 104.4 | 104.4 |
| | Thickness | μm | 23 | 23 | 23 | 23 | 23 | 23 | 23 |
| | Air permeability[Note 1] | sec/100 cc | 200 | 184 | 125 | 111 | 120 | 128 | 118 |
| | TD dimensional stability (dimension change ratio) | Evaluation (%) | ◉ (0.9) | ○ (2.1) | ○ (2.1) | ○ (3.4) | ○ (4.5) | ○ (2.5) | ○ (3.6) |

| | Item | Unit | Example C8 | Example C9 | Comparative Example C1 | Comparative Example C2 | Comparative Example C3 | Comparative Example C4 | Comparative Example C5 |
|---|---|---|---|---|---|---|---|---|---|
| | | | PE-C1 | | | | PE-C1 | | |
| TD stretching | Ratio | Times | 1.2 | 1.2 | — | 1.2 | 1.2 | 1.2 | 1.2 |
| | Temperature | ° C. | 100 | 70 | — | 70 | 70 | 70 | 110 |
| | Wind speed | m/sec | 9.3 | 9.3 | — | 9.3 | 9.3 | 9.3 | 9.3 |
| Thermal fixing | Temperature | ° C. | 120 | 110 | — | 70 | 90 | 130 | 110 |
| | Relaxation ratio | % | 0 | 0 | — | 0 | 0 | 0 | 0 |
| | Wind speed | m/sec | 9.3 | 9.3 | — | 9.3 | 9.3 | 9.3 | 9.3 |
| TD total stretching ratio | | Times | 1.2 | 1.2 | — | 1.2 | 1.2 | 1.2 | 1.2 |
| Biaxially-stretched film physical property value | Film width retention ratio | % | 104.4 | 104.4 | 87.0 | 104.4 | 104.4 | Film fracture | Film fracture |
| | Thickness | μm | 23 | 23 | 24 | 23 | 23 | | |
| | Air permeability[Note 1] | sec/100 cc | 125 | 104 | 335 | 147 | 133 | | |

TABLE C2-continued

|  |  |  |  |  |  |  |
|---|---|---|---|---|---|---|
| TD dimensional stability (dimension change ratio) | Evaluation (%) | ○ (4.4) | Δ (5.1) | — | X (7.2) | X (7.1) |

Note 1) value converted for 20 μm.

TABLE C3

| Item | | Unit | Example C10 | Example C11 | Example C12 | Example C13 PP-C1 | Example C14 | Example C15 | Example C16 | Comparative Example C6 | Comparative Example C7 PP-C1 |
|---|---|---|---|---|---|---|---|---|---|---|---|
| TD stretching | Ratio | Times | 1.2 | 1.2 | 1.2 | 1.2 | 1.2 | 1.2 | 1.2 | — | 1.2 |
|  | Temperature | ° C. | 28 | 70 | 100 | 28 | 70 | 100 | 126 | — | 140 |
|  | Wind speed | m/sec | 13.7 | 18.2 | 18.2 | 13.7 | 18.2 | 18.2 | 18.2 | — | 18.2 |
| Thermal fixing | Temperature | ° C. | 140 | 140 | 140 | 130 | 130 | 130 | 146 | — | 140 |
|  | Relaxation ratio | % | 0 | 0 | 0 | 0 | 0 | 0 | 0 | — | 0 |
|  | Wind speed | m/sec | 13.7 | 18.2 | 18.2 | 13.7 | 13.7 | 18.2 | 18.2 | — | 18.2 |
| TD total stretching ratio | | Times | 1.2 | 1.2 | 1.2 | 1.2 | 1.2 | 1.2 | 1.2 | — | 1.2 |
| Biaxially-stretched film physical property value | Film width retention ratio | % | 105.6 | 105.6 | 105.6 | 105.6 | 105.6 | 105.6 | 105.6 | 88.0 | 105.6 |
|  | Thickness | μm | 24 | 24 | 24 | 24 | 24 | 24 | 24 | 24 | 24 |
|  | Air permeability Note 1) | sec/100 cc | 129 | 128 | 126 | 122 | 125 | 124 | 121 | 264 | 152 |
|  | TD stretching unevenness | — | ⊚ | ⊚ | ⊚ | ⊚ | ⊚ | ⊚ | ○ | ⊚ | Δ |

Note 1) value converted for 20 μm.

TABLE C4

| Item | Unit | PE-C2 | PP-C2 |
|---|---|---|---|
| Extrusion temperature | ° C. | 180 | 260 |
| Die temperature | ° C. | 180 | 260 |
| Die lip clearance | mm | 2.5 | 1 |
| Draft ratio | Times | 350 | 90 |
| Melting point (Tm) | ° C. | 132 | 166 |

TABLE C5

| Item | | Unit | Three-layered laminate porous film (PP-C2/PE-C2/PP-C2) |
|---|---|---|---|
| Laminating | Temperature | ° C. | 132 |
|  | Pressure | kg/cm | 2.7 |
| Annealing | | | 130° C.-30 min (continuous) |
| MD cold stretching | Ratio | Times | 1.3 |
|  | Temperature | ° C. | RT |
| MD heat stretching | Ratio | Times | 2.5 |
|  | Temperature | ° C. | 120 |
| MD Thermal fixing | Temperature | ° C. | 130 |
|  | Relaxation ratio | % | 10 |
| MD total stretching ratio | | Times | 2.93 |
| Total thickness of layers | | μm | 30 |
| Film width retention ratio | | % | 88.0 |
| Glass-transition temperature (Tg) | PE layer | ° C. | −126 |
|  | PP layer |  | −2 |

TABLE C6

| Item | | Unit | Example C17 | Comparative Example C8 | Comparative Example C9 | Comparative Example C10 |
|---|---|---|---|---|---|---|
| Layer constitution of three-layered porous film | | — | PP-C2/ PE-C2/ PP-C2 | PP-C2/PE-C2/PP-C2 | | |
| TD stretching | Ratio | Times | 1.2 | — | 1.2 | 1.2 |
|  | Temperature | ° C. | 100 | — | 100 | 126 |
|  | Wind speed | m/sec | 18.2 | — | 18.2 | 18.2 |
| Thermal fixing | Temperature | ° C. | 130 | — | 100 | 126 |
|  | Relaxation ratio | % | 0 | — | 0 | 0 |
|  | Wind speed | m/sec | 18.2 | — | 18.2 | 18.2 |
| TD total stretching ratio | | Times | 1.2 | — | 1.2 | 1.2 |
| Biaxially-stretched film physical | Film width retention ratio | % | 105.6 | 88 | 105.6 | 105.6 |
|  | Thickness of PP layer | μm | 12 | 12 | 12 | 12 |

TABLE C6-continued

| Item | | Unit | Example C17 | Comparative Example C8 | Comparative Example C9 | Comparative Example C10 |
|---|---|---|---|---|---|---|
| property value | Thickness of PE layer | | 9 | 9 | 9 | 9 |
| | Thickness of all layers | | 30 | 30 | 30 | 30 |
| | Air permeability[Note 1] | sec/100 cc | 89 | 230 | 109 | 105 |
| | TD stretching unevenness | — | | ◎ | ◎ | ◎ | Δ |
| | TD dimensional stability (dimension change ratio) | Evaluation (%) | ◎ (1.3) | — | Δ (4.4) | ○ (2.2) |

[Note 1] value converted for 20 μm in thickness.

TABLE C7

| | Item | | Unit | Example C18 PE-C1 |
|---|---|---|---|---|
| Coating film physical property | Thickness | Base material layer | μm | 23 |
| | | Heat resistant porous layer | | 7 |
| | TOTAL | | | 30 |
| | Air permeability[Note 1] | | sec/100 cc | 115 |

[Note 1] value converted for 20 μm based on thickness of base material layer (thickness of heat resistant porous layer is ignored)

As is obvious from the results shown in Table C2, Table C3, and Table C6, by performing the thermal fixation within the condition range of Tm−40° C. to Tm−3° C. after performing the thermal fixation at a temperature higher than the TD stretching temperature as the producing method of the polyolefin-based porous film, the obtained porous film could obtain higher air permeability while maintaining excellent dimensional stability.

INDUSTRIAL APPLICABILITY

The polyolefin-based porous film obtained by the present invention can be suitably used as, in particular, a separator for a high-performance secondary battery.

DESCRIPTION OF REFERENCE NUMERALS 1 porous film impregnated with electrolyte
2A nickel foil
2B nickel foil
3A glass plate
3B glass plate
4 Teflon™ tape
5 opening
6 wooden plate
7A thermocouple
7B thermocouple
8 silicone rubber
9 hot plate
10 heater
11 heater wire
12A lead wire
12B lead wire
13 pressing machine
14 cylinder
15 electric resistance measuring apparatus
16 thermometer
17 data collecting apparatus
18 temperature controller

The invention claimed is:

1. A method for producing a polyolefin-based porous film comprising:
   an (A) step of forming a non-porous raw fabric from a polyolefin-based resin composition, the polyolefin-based resin composition comprising at least one of a polyethylene and a polypropylene;
   a (B) step of cold stretching the non-porous raw fabric obtained in the (A) step at a temperature of −20° C. to (Tm−30)° C., where Tm is a melting point (° C.) of the non-porous raw fabric, in an extruding direction (MD) of the raw fabric to make the raw fabric porous;
   a (D) step of cold stretching a film processed in the (B) step in a direction (TD) perpendicular to the MD, where a stretching ratio in the TD is 1.10 to 1.5 times; and
   a (H) step of thermal fixing in the TD by heating the film without substantially stretching the film,
   where the steps (A), (B), (D) and (H) are performed in the above order, and
   wherein a thermal fixing temperature $T_2$ (° C.) in the (H) step satisfies (1) and (2) below:

$$T_2 > T_1 \tag{1}$$

$$(Tm-3) \geq T_2 \geq (Tm-40) \tag{2}$$

and a stretching temperature $T_1$ (° C.) in the (D) step satisfies $T_1 \leq (Tm-30)$,
   where Tm represents the melting point (° C.) of the non-porous raw fabric.

2. The method according to claim 1, wherein the stretching temperature $T_1$ in the (D) step satisfies $(Tg+20) \leq T_1 \leq (T_2-5)$,
   where Tg represents a glass-transition temperature (° C.) of the porous film subjected to the cold stretching.

3. A polyolefin biaxially-stretched porous film prepared by the method according to claim 1.

* * * * *